United States Patent
Don et al.

(10) Patent No.: US 6,901,480 B2
(45) Date of Patent: May 31, 2005

(54) METHOD AND APPARATUS FOR RECONFIGURING STRIPED LOGICAL DEVICES IN A DISK ARRAY STORAGE

(75) Inventors: Arieh Don, Newton, MA (US); Mathieu Gagne, Boston, MA (US); Kenneth Halligan, Leominster, MA (US); Ishay Kedem, Brookline, MA (US); Hana Moreshet, Framingham, MA (US); Alexandr Veprinsky, Brookline, MA (US); Natan Vishlitzky, Brookline, MA (US); Aviram Cohen, Lexington, MA (US)

(73) Assignee: EMC Corporation, Hopkinton, MA (US)

( * ) Notice: Subject to any disclaimer, the term of this patent is extended or adjusted under 35 U.S.C. 154(b) by 0 days.

(21) Appl. No.: 10/777,891

(22) Filed: Feb. 12, 2004

(65) Prior Publication Data

US 2004/0162957 A1 Aug. 19, 2004

Related U.S. Application Data

(63) Continuation-in-part of application No. 10/400,208, filed on Mar. 27, 2003, now Pat. No. 6,718,437, which is a continuation-in-part of application No. 09/676,709, filed on Sep. 29, 2000, now Pat. No. 6,546,457.

(51) Int. Cl.[7] .............................................. G06F 12/00
(52) U.S. Cl. ...................................... 711/114; 711/165
(58) Field of Search .................................. 711/114, 161, 711/162, 165, 170

(56) References Cited

U.S. PATENT DOCUMENTS

| | | | |
|---|---|---|---|
| 5,479,653 A | 12/1995 | Jones | |
| 5,502,836 A | 3/1996 | Hale et al. | |
| 5,524,204 A | 6/1996 | Verdoorn, Jr. | |
| 5,574,851 A | 11/1996 | Rathunde | |
| 5,615,352 A | 3/1997 | Jacobson et al. | |
| 5,657,468 A | 8/1997 | Stallmo et al. | |
| 5,758,118 A | 5/1998 | Choy et al. | |
| 5,875,456 A | 2/1999 | Stallmo et al. | |
| 6,000,010 A | 12/1999 | Legg | |
| 6,052,759 A | 4/2000 | Stallmo et al. | |
| 6,209,059 B1 | 3/2001 | Ofer et al. | |
| 6,243,790 B1 | 6/2001 | Yorimitsu | |
| 6,275,898 B1 | 8/2001 | DeKoning | |
| 6,282,619 B1 | 8/2001 | Islam et al. | |
| 6,304,942 B1 | 10/2001 | DeKoning | |
| 6,347,359 B1 | 2/2002 | Smith et al. | |
| 6,405,284 B1 | 6/2002 | Bridge | |
| 6,415,372 B1 | 7/2002 | Zakai et al. | |

Primary Examiner—Kevin Verbrugge
(74) Attorney, Agent, or Firm—George A. Herbster

(57) ABSTRACT

A method and apparatus for enabling an on-line reconfiguration of striped data in a disk array storage device. A replicated copy of the striped logical device is made in parallel with host operations. A logical device with a new configuration is then substituted for access by the host application even before any data is transferred to locations within the newly configured logical device. Independent processes operating in this disk array storage device reconfigure the data transparently to any host operations while accommodating host I/O requests directed to locations in the new configuration.

18 Claims, 10 Drawing Sheets

| STRIPE NUMBER | PHYSICAL DISK DRIVE | | |
| --- | --- | --- | --- |
| | 31 | 33 | 35 |
| 1 | A | B | C |
| 2 | D | E | F |
| 3 | G | H | I |
| 4 | J | K | L |

FIG. 8

| STRIPE NUMBER | PHYSICAL DISK DRIVE | | | |
| --- | --- | --- | --- | --- |
| | 31 | 33 | 35 | 37 |
| 1 | A | B | C | D |
| 2 | E | F | G | H |
| 3 | I | J | K | L |
| 4 | M | N | O | P |

FIG. 9

METHOD AND APPARATUS FOR RECONFIGURING STRIPED LOGICAL DEVICES IN A DISK ARRAY STORAGE

CROSS-REFERENCE TO RELATED APPLICATIONS

This application is a continuation of U.S. Ser. No. 10/400,208 filed Mar. 27, 2003 now U.S. Pat. No. 6,718,437, which is a continuation of U.S. Ser. No. 09/676,709 filed Sep. 29, 2000 (now U.S. Pat. No. 6,546,457).

U.S. Pat. No. 6,101,497 issued Aug. 8, 2000, for a Method and Apparatus for Independent and Simultaneous Access to a Common Data Set of Yuval Ofek that is assigned to the same assignee as this invention.

U.S. Letters patent Ser. No. 09/303,242 filed Apr. 30, 1999, for a Method and Apparatus for Independent and Simultaneous Access to a Common Data Set of Mathieu Gagne et al. that is assigned to the same assignee as this invention.

U.S. Letters patent Ser. No. 09/342,608 filed Jun. 29, 1999, for a Method for Making Independent Data Copies in a Data Processing System of Ishay Kedem et al. that is assigned to the same assignee as this invention.

BACKGROUND OF THE INVENTION

1. Field of the Invention

This invention is generally directed to data processing systems including host processors and data stores formed at one or more disk array storage devices. More specifically this invention is directed to a method and apparatus for effecting an on-line, transparent reconfiguration of data on a data store, particularly a data store with striped files or logical devices.

2. Description of Related Art

Data processing systems include a processor to execute application programs for manipulating data located in a data store. In large applications the data processor comprises multiple central processors and the data store comprises one or more disk array storage devices to provide a large storage capacity.

A disk array storage device typically includes a plurality of physical disk drives that store data organized into one or more logical volumes or devices, hereinafter "logical devices". In these systems a host issues commands addressing a logical device in the disk array storage device. A host adapter converts the logical device address from a host into an address that specifies a location of a data block on a physical disk drive. In disk array storage devices available from the assignee of this invention the logical device address converts into a cylinder and read/write head address that, in turn, converts into a specific location on a physical disk drive according to the structure of that physical disk drive.

Different logical devices may be stored with different structures. For example, certain RAID storage schemes and data striping structures distribute data in a single logical device over multiple physical disk drives with the objective of achieving redundancy, load balancing, recovery and other goals. With respect to striping, many host requests to a non-striped logical device can produce maximum activity around a localized set of logical device addresses that tend to be concentrated on a single physical disk drive. Other physical disk drives that store other logical devices can remain relatively inactive. This uneven loading can adversely effect the operating characteristics of the disk array storage device. Striping can provide load balancing when such conditions exits. A striped logical device divides the data into a number of successive data blocks of contiguous locations on a plurality of physical disk drives. When the logical device is characterized as having tracks defined by logical cylinders and read/write heads, the data can be considered as residing on multi-track logical cylinders. A logical cylinder subset can be considered to have the capacity of a small number of cylinders in a particular physical disk drive. Data is distributed over successive physical disk drives so it is likely that multiple physical disk drives will respond to host requests and thereby balance loading.

In other applications it is possible for the storage requirement for a single logical device to exceed the capacity of a single physical disk drive. "Meta devices" provide an alternate data structure that uses multiple physical disk drives to store a single logical device. In "concatenated" meta devices, the data fills each physical disk drive in sequence. In this scheme a first logical address is located on a first physical disk drive, that is a "head element". Additional physical disk drives are chained from the head element to store data in additional locations. The last physical disk drive in the chain is a "tail element"; any intermediate physical disk drives are "meta elements."

Expansion of such a concatenated meta device merely requires blocking access to the logical device and updating a configuration file for that logical device. More specifically, the reconfiguration results in chaining another physical disk drive to the tail element, designating the prior tail element as a meta element and designating the new physical disk drive as the tail element. This reconfiguration requires no data transfers. As soon as the configuration file is updated, the host is enabled to access the reconfigured or augmented logical device.

Some meta devices are structured with striping. For a given size meta device, the stripes may be applied to the same physical devices that would store the meta device in a concatenated configuration. In other situations the stripes may be sized so that they are distributed across a greater multiple of physical disk drives thereby to occupy only portions of any one physical disk drive, although any one physical disk drive generally stores multiple stripes within a portion allocated to the meta device.

The reconfiguration of any striped logical device for the purpose of expansion or of changing stripe size or both is more complicated than the a reconfiguration of a non-striped logical device primarily because most of the data in such a striped logical device must be relocated from one physical disk drive to another. For example, if each physical disk drive contains multiple stripes in a single logical device and a physical disk drive is added to expand the logical device capacity, it will be desirable to move the data in a second stripe on a first physical disk drive to the first stripe on the new physical disk drive. Corresponding data shifts from each successive stripe location to other stripe locations also will occur.

One approach to shifting such data could involve taking the entire logical device out of service to reconfigure the data through a sequence of copy operations. In many situations, however, taking a logical device out of service for a considerable time period is just not acceptable. Alternatively if sufficient physical disk drives are available, all the existing data might be copied to a buffer for reconfiguration while the host continues to work with the existing data. The reconfiguration could then occur in parallel to continue interaction between the host and the existing data until the reconfiguration was complete. Then the reconfigured data could be substituted for the existing data or could be copied to replace the existing data and then reattached to the host. However, this approach requires some mechanism to track any changes a host application makes to the existing data during the reconfiguration and could require the data to be taken off-line for a considerable period of time. Moreover such a process can require significant processor resources that could adversely effect system performance even further. What is needed is a method and apparatus for enabling the reconfiguration of data concurrently with and transparently to host operations with the data being reconfigured.

SUMMARY

Therefore it is an object of this invention to provide a method and apparatus that enables a straightforward reconfiguration of a striped logical device.

Another object of this invention is to provide a method and apparatus for enabling the reconfiguration of a striped logical device transparently to host operations.

Still another object of this invention is to provide a method and apparatus for enabling the reconfiguration of a striped logical device while the data in that logical device remains on-line and accessible to a host processor.

Yet another object of this invention is to provide a method and apparatus for enabling the reconfiguration of a striped logical device while the data in that logical device remains on-line and accessible to a host processor, all transparently to host operations.

In accordance with one aspect of this invention, the reconfiguration of a striped logical device that is distributed across a plurality of physical disk drives and that operates in response to input-output requests from a host includes the step of making a copy of the stripped logical device in the original configuration concurrently with operations between the host and the logical device according to an original configuration. After the copy is isolated, the logical device is switched to its new configuration. The host thereafter immediately interacts with the logical device in its new configuration. Data is transferred from locations in the isolated copy to corresponding locations according to the new configuration concurrently with host interaction with the logical device. An input-output request from the host for non-transferred data initiates a transfer of data from a corresponding location in the copy to the location according to the new configuration identified by the input-output configuration.

BRIEF DESCRIPTION OF THE DRAWINGS

The appended claims particularly point out and distinctly claim the subject matter of this invention. The various objects, advantages and novel features of this invention will be more fully apparent from a reading of the following detailed description in conjunction with the accompanying drawings in which like reference numerals refer to like parts, and in which:

FIG. 8 is a table that depicts the effect of this invention when the original configuration is modified by changing the stripe size; and FIG. 9 is a table that depicts the effect of this invention when the original configuration is modified by changing the stripe size and by increasing the number of physical disk drives that store the logical device.

DESCRIPTION OF ILLUSTRATIVE EMBODIMENTS

Figure 1:
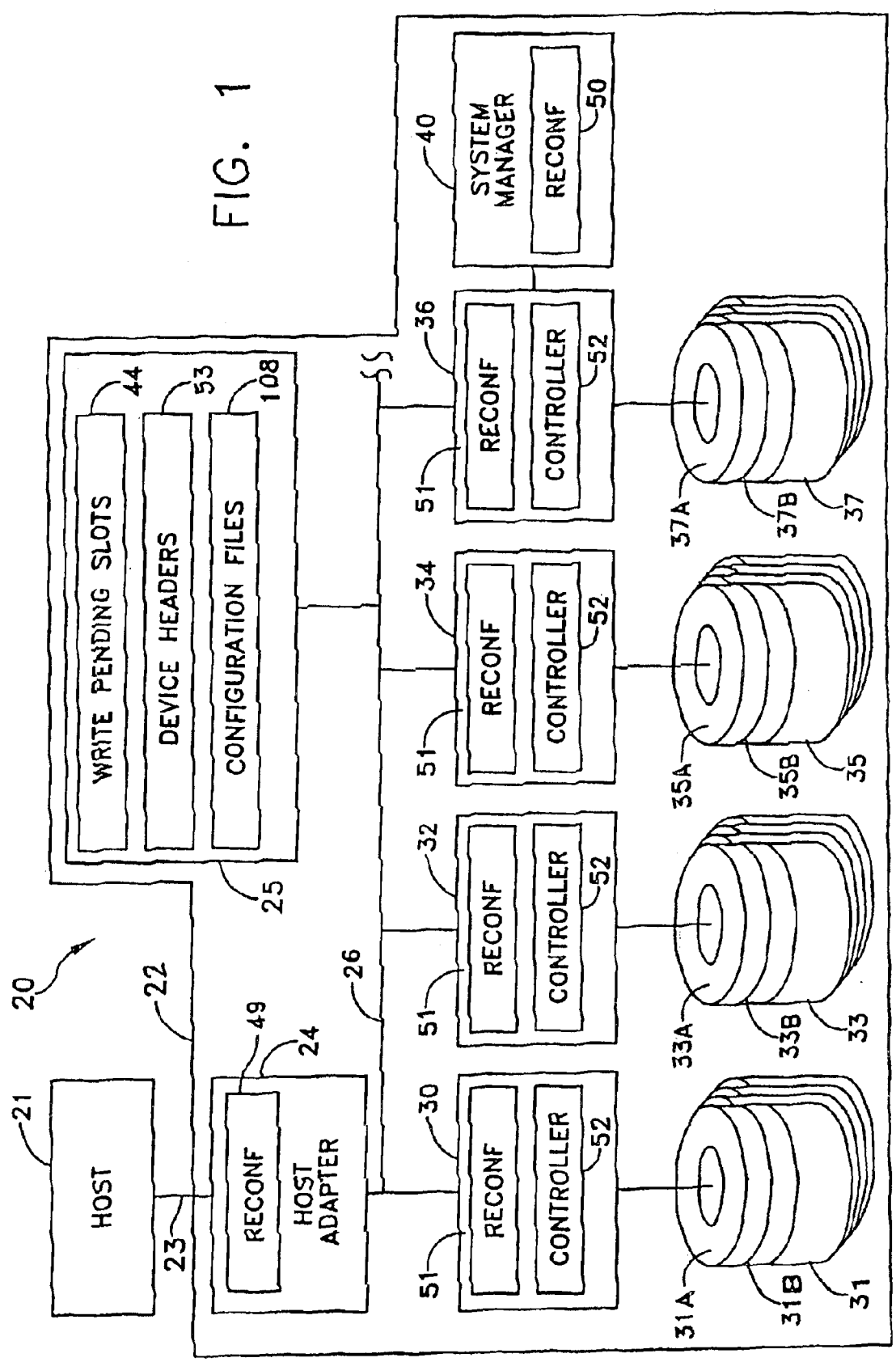
FIG. 1 is a diagram of a data processing system and data store including a disk array storage device that embodies this invention.

FIG. 1 depicts a data processing system 20 with a host 21 with one or more host processors, or hosts, for controlling operations in response to one or more programs. In the following discussion "host application" means a particular application program, procedure, process, module or the like being processed by a host processor.

A host application accesses and processes data stored in a data store that is constituted by a data store 22 with a disk array storage device with communications over a system bus 23 that can take any of several known forms including single and parallel bus structures. The data store 22 may include additional disk array storage devices. For purposes of this disclosure, however, the data store 22 is shown with only a single disk array storage device.

This invention can be implemented in a number of disk storage devices of different types and configurations. The following description is made in the context of a specific disk array storage device, namely: a Symmetrix disk array storage device that is available from the assignee of this invention. The adaptation of this specifically described embodiment for implementation in disk array storage devices available from other manufacturers will become apparent to persons of ordinary skill in the art.

A Symmetrix disk array storage device includes a host adapter 24 and a cache memory 25 that communicate with each other and with a series of disk adapters and physical disk drives over a bus 26. FIG. 1 depicts, for example, a first disk adapter 30 with an array of physical disk drives that store a complete logical device, a plurality of logical devices or, in the case of a striped logical device, data contained in plural stripes. The physical disk drive 31 is one such physical disk drive. A disk adapter 32 controls a number of physical disk drives including a physical disk drive 33. Likewise a disk adapter 34 controls the operation of a number of physical disk drives including a physical disk drive 35; disk drive controller 36, a number of physical disk drives including a physical disk drive 37.

FIG. 1 also depicts a system manager or service processor 40 that, as known in the art, provides a facility for performing a number of functions relative to the internal operation of the disk array storage device 22 including its reconfiguration. In a Symmetrix disk array storage device, the service processor 40 is a node in a local network including all host adapters, like the host adapter 24, and all the disk adapters, like the disk adapters 30, 32, 34 and 36. FIG. 1 depicts one connection between the service processor 40 and one disk adapter 36 as representative of the local network.

Striped Configuration

The service processor 40 provides a means for establishing any arbitrary configuration by means of correspondences between logical devices and physical disk drives. Assuming, in accordance with previous discussions, that the data is considered to be located by a cylinder number (C) and read/write head number (H) a specific physical disk track can be identified with an address having the form [DCH] where the combination of the "D" and "C" values will identify a specific physical disk drive unit and a logical cylinder on that physical disk drive unit.

Figure 2:
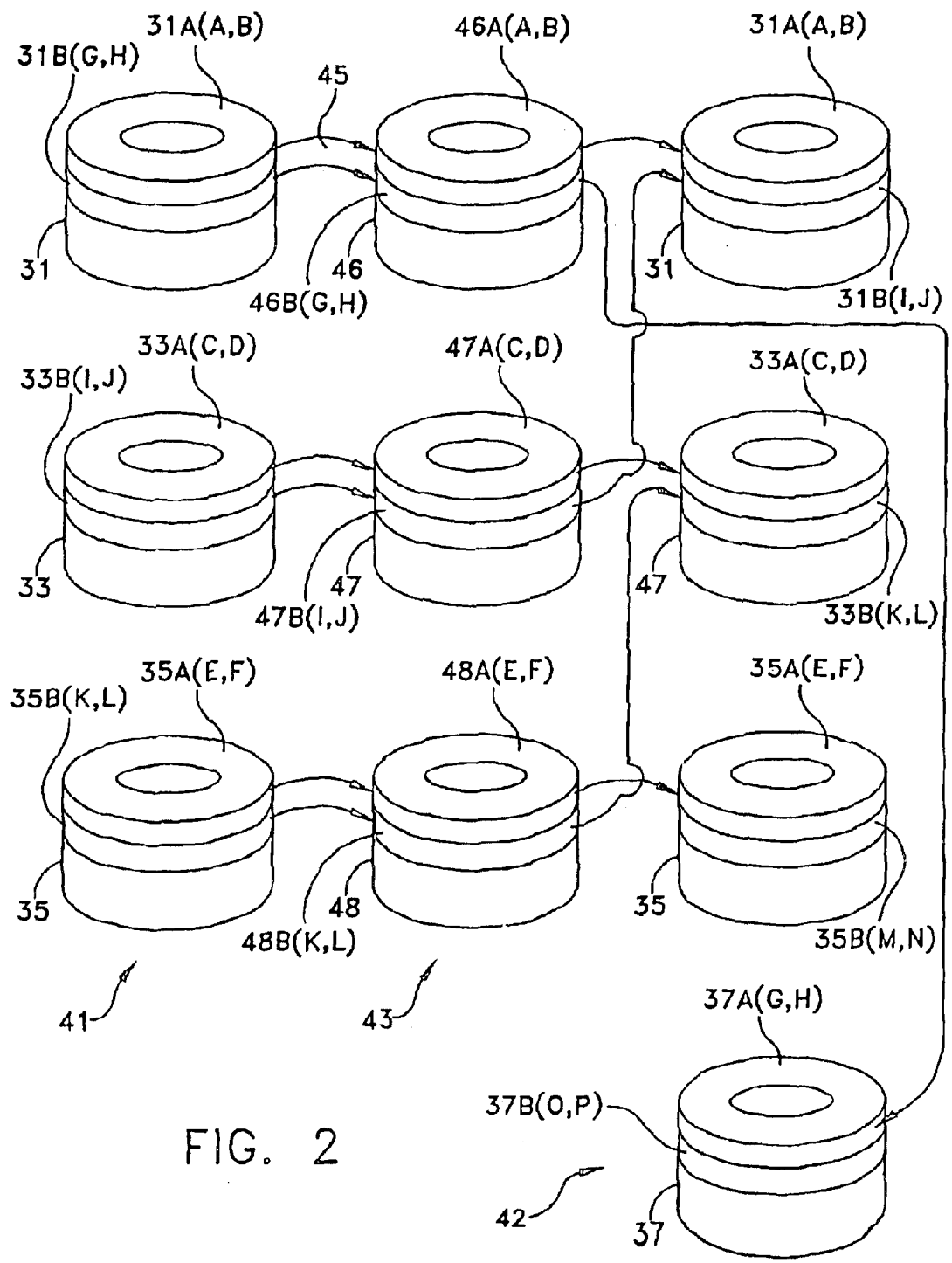
FIG. 2 is a diagram that is useful in understanding the reconfiguration of a striped logical device in accordance with the invention.

For purposes of explaining this invention; it is assumed that the service processor 40 has defined a logical device that is distributed over three physical disk drives 31, 33 and 35 in six logical cylinder subsets or stripes of two logical cylinders as shown in FIGS. 1 and 2. More specifically in this configuration a logical cylinder subset 31A stores cylinders A and B of the logical device. logical cylinder subsets 33A and 35A store logical device cylinders C and D and cylinders E and F, respectively. The striping is completed by storing logical device cylinder G and H in logical cylinder subset 31B, logical device cylinders I and J on logical cylinder subset 33B and logical device cylinders K and L on logical cylinder subset 35B. If the logical device is a meta device, the physical disk drive 31 is the head element; the physical disk drive 35 is the tail element; and the physical disk drive 33 is a meta element.

FIG. 2 depicts each stripe or logical cylinder subset with two logical cylinders. It will be understood that each logical cylinder subset could include a single logical cylinder or three or more contiguous logical cylinders depending upon the desired stripe size.

This invention is particularly adapted when system requirements necessitate either the modification of a stripe size or the expansion of a striped logical device. FIG. 2 depicts an expansion from an original configuration, the logical device 41, to a new configuration, the logical device 42 with an additional physical disk drive 37. The physical disk drive has logical cylinder subsets 37A and 37B to provide the increased capacity. For a striped logical device the data stored in certain cylinder subsets must be relocated to maintain the striping scheme of the logical device 41 in its original configuration. In the specific expansion of FIG. 2, data on the logical cylinder subsets 31A, 33A and 35A, that is the data in logical cylinders A through F, need not be moved. However, the data on logical cylinder subset 31B, i.e., data in the logical cylinders G and H, must move to the logical cylinder subset 37A. Logical cylinders I and J and logical cylinders K and L must move to the logical cylinder subsets 31B and 33B, respectively. The logical cylinder subsets 35B and 37B are available for expansion as new logical cylinders M and N and logical cylinders O and P, respectively.

In general terms this invention accomplishes any such reconfiguration transparently while the data remains on-line to a host application with only minimal interruption to host operations. Initially the reconfiguration process of this invention replicates the data in original logical device 41 onto an independent physical disk drives as a replicated logical device 43. FIG. 2 depicts a path 45 for transferring data from the logical cylinder subsets 31A and 31B to logical cylinder subsets 46A and 46B on physical disk drive 46. Similar paths exist for transferring data from the physical drives 33 and 35 to physical disk drives 47 and 48.

This process uses a RECONF module 49 in the host adapter 24, a RECONF module 50 in the service processor 40 and RECONF modules 51 in each disk adapter. The RECONF modules 51 in each disk adapter and the RECONF module 50 coact to generate three lists or tables. The first list identifies each location on the physical disk drives that stores the replicated logical device 43 on the physical disk drives 46 through 48. The second list identifies all the data locations on the physical disk drives that will store the data across the physical disk drives 31, 33, 35 and 37 in the logical device 42 in the new configuration. In accordance with the preferred form of this invention, each data location in each list corresponds to one logical track or "track" in a corresponding physical disk drive. Thus, the first list identifies each track in the replicated logical device 43 and hence in the original configuration. A second list identifies each track in the new logical device 42. A third list identifies each track for which an entry in a Track ID table must be transferred to the replicated logical device 43.

Figure 3:
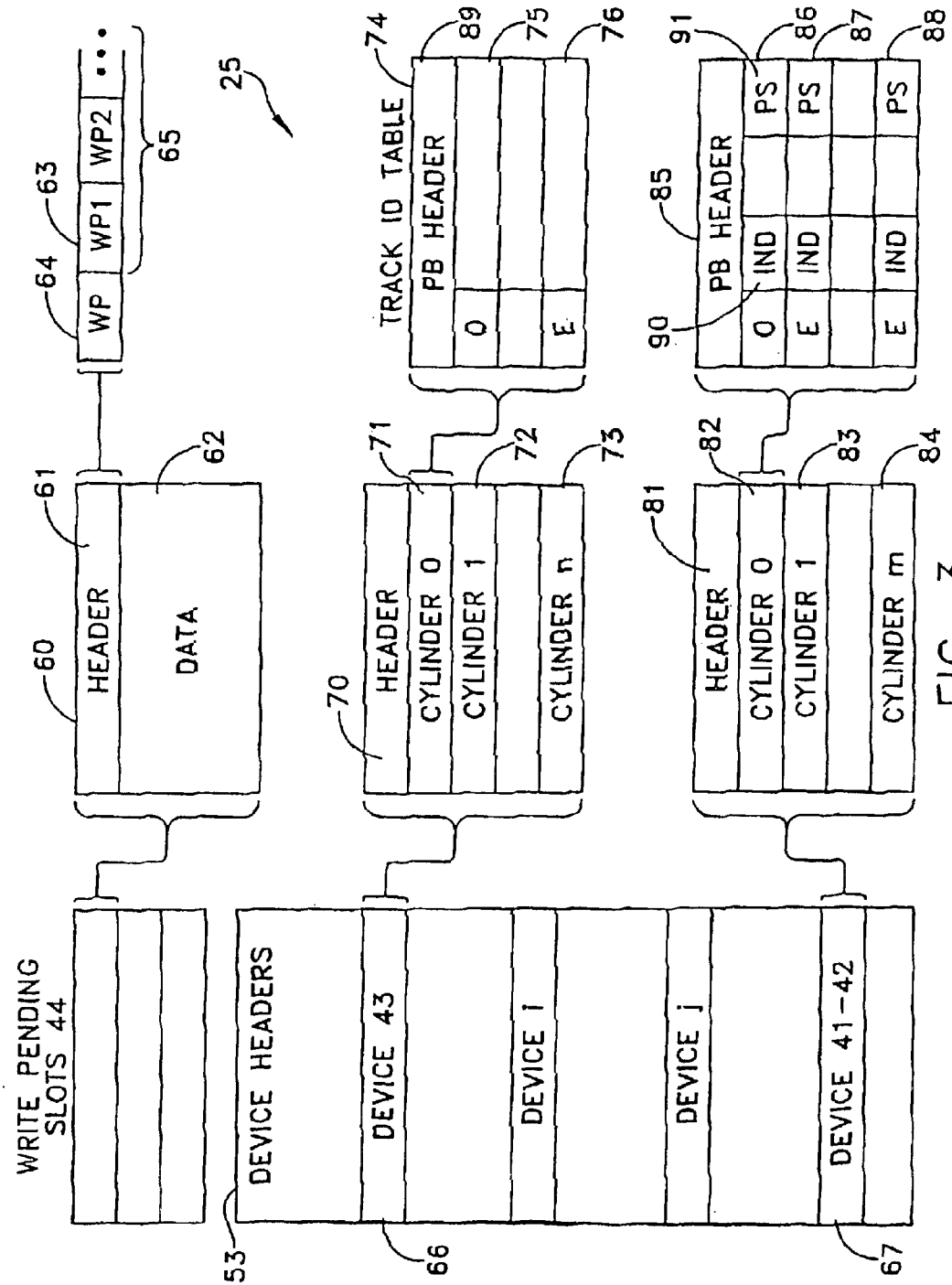
FIG. 3 depicts tables used in the disk array storage device of FIG. 1 that are useful in understanding this invention.

FIG. 3 depicts the structure and location of one embodiment of those lists in greater detail. In a Symmetrix disk array storage device the cache memory in FIGS. 1 and 3 contains write pending slots 44 and logical device headers 53. Looking first at the write pending slots 44, an individual write pending slot, such as a write pending slot 60, includes a header 61 and a data block 62 that normally contains data for one physical track. Each header 61 includes a WP flag 64 and a set of WPk flags 65 where "k" is a mirror number where $k \leq 4$. Each WPk flag 65, when set, indicates a need for destaging data from the corresponding write pending slot 60 to a corresponding physical disk drive device. Once the data is transferred from the cache memory 25 to the corresponding data storage device, such as the physical disk drive 31, the system clears the corresponding WPk flag 65. The WP flag 64 is set whenever any one or more of the WPk flags 65 is set. Each header includes other information that is not relevant to this invention and, accordingly, is not shown.

The logical device headers include one entry for each logical device in a Symmetrix disk array storage device. In accordance with this invention and is shown in FIG. 3, a first logical device header 66 corresponds to the replicated logical device 43 shown in FIG. 2. A logical device header 67 initially corresponds to the logical device 41 in the original configuration. During the reconfiguration process the logical device header 67 is modified to correspond to the logical device 42 in the new configuration. FIG. 3 also depicts other logical device headers for DEVICE(i) and DEVICE(j) as other logical devices that can coexist in the disk array storage device 22 for interaction with host applications.

Each device header entry has the same organization. That is, the device header 66 for the replicated original configuration of the file includes a header 70 and a plurality of entries 71 for each cylinder in the logical device 43. Only three specific entries are shown, namely; a Cylinder 0 entry 71, a Cylinder 1 entry 72 and a Cylinder n entry 73. Each of the cylinder entries, such as Cylinder 0 entry 71, points to one Track ID table 74 with one location assigned to each track in each logical cylinder as represented by a specific read/write head in the physical disk drive. Two track entries are shown, namely: a Track 0 entry 75 and a Track E entry 76.

The device header 67 also comprises a header 81 and a plurality of cylinder entries including a Cylinder 0 entry 82, a Cylinder 1 entry 83 and a Cylinder m entry 84. As will be apparent, n=m or n≠m. The Track ID Table 85 includes an entry for each read/write head or track. These include a representative Track 0 entry 86, a Track 1 entry 87 and a Track E entry 88.

Still referring to FIG. 3, each Track ID block, such as either of the Track ID blocks 74 and 85, includes various items of information that will be interpreted differently depending upon whether a corresponding logical device track stores the replicated logical device 43 or the reconfigured logical device 42. For example, the Track ID block 74 includes a PB header 89 that, as known, can be considered as a two-dimensional array with one row for each track and one column per session. In Symmetrix disk array storage systems, each row is 2 bytes wide to define up to 16 sessions. A particular PB bit position will be identified in the form PB(x,y) where x indicates a track in a cylinder and y indicates a session number or identifier. In accordance with this invention, the RECONF module 50 in FIG. 1 determines whether any "y" column is available. If one is available, the controller establishes a session identification correlated to the selected PB bit column. In the following discussion a reference to a "PB bit" will be to the PB bit column assigned to the reconfiguration session and to a row assigned to the track in the logical device.

Only the information in the PB header 89 in the Track ID tables 74 for the physical disk drives associated with the replicated file 43 in FIG. 2 is used. Other flags associated with the replicated logical device 43 are not important to an understanding of this invention.

Two bits or flags are used with respect to the physical disk drives constituting the logical device 42 with new configuration. Specifically, the RECONF modules 49 and 50 utilize IND and PS bits for each track, such as an IND bit 90 and PS bit 91 in the track entry 86 in the Track ID table 85. The IND bit establishes the relevancy of the data at the corresponding track in the new configuration. The PS bit indicates that the track still contains data according to the original configuration.

In the disclosed specific embodiment, the first list comprises the PB bits in the PB header 89 associated with the replicated logical device 43 in the logical device header 66. The IND bits 90 and the PS bits 91 constitute the second and third lists, respectively. After these lists are compiled, the reconfiguration is effected and all host requests are then directed to addresses according to the new configuration, even though the data on the physical disk drives has not been moved. In accordance with this invention, this feature is achieved by a reconfiguration process that uses multiple processes that run in parallel with any host application and in parallel with each other and an I/O request handler that assures a correct response to any I/O request.

A data transfer background process in the RECONF modules 51 uses the first list comprising the PB bits in the PB header 89 to effect data transfers from the physical disk drives 46 through 48 to appropriate locations in the newly configured physical disk drives 31, 33, 35 and 37. For example, this process could relocate all the data in the logical device cylinders G and H from the physical disk drive 46 to the logical cylinder subset 37A.

A data store 22 shown in FIG. 1, can have data stored in the write pending slots at the time an instant split occurs. A pending split background process uses the third list to transfer any data in the write pending slots 44 to the replicated logical device 43 so that the data in those write pending slots is reflected in the new configuration eliminating the possibility of data corruption.

An I/O handling process responds to each I/O request by using the second and third lists to transfer corresponding data to the correct location within the reconfigured physical disk drives 31, 33, 35 and 37. As will become evident, the data transfer process will use elements of the pending split process and the I/O handling process will use elements of both the pending split and data transfer processes. This also assures that the reconfiguration is conducted in an orderly fashion without any possibility of data corruption and in parallel with the interaction between a host application and the new configuration of the logical device.

In a preferred embodiment of this invention, the replicated logical device 43 is distributed over physical disk drives 46, 47 and 48 that are BCV devices as described in the above-identified U.S. Pat. No. 6,101,497. With BCV devices an ESTABLISH command attaches the BCV devices to the original physical disk drives to replicate the logical device. In FIG. 2 the ESTABLISH command produces the replicated logical device 43 in which the data in the logical cylinder subsets 31A, 31B, 33A, 33B, 35A and 35B transfers to the logical cylinder subsets 46A, 46B, 47A, 47B, 48A and 48B, respectively. This occurs in parallel with host accesses to the logical device 41 in the original configuration.

The Reconfiguration Process

Figure 4A:
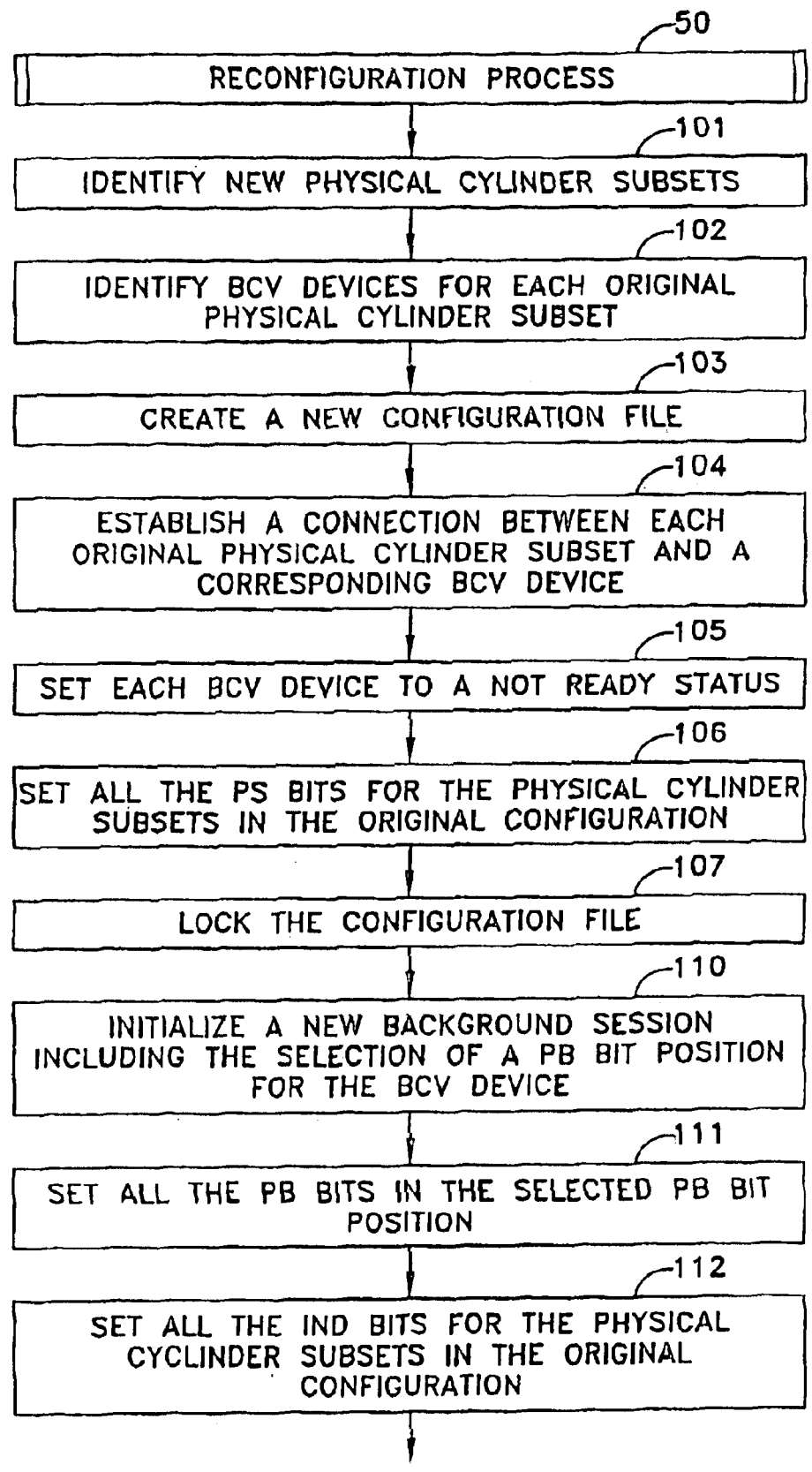
FIGS. 4A and 4B constitute a flow chart of an initial operating process for enabling the reconfiguration of a striped logical device in accordance with this invention.
Figure 4B:
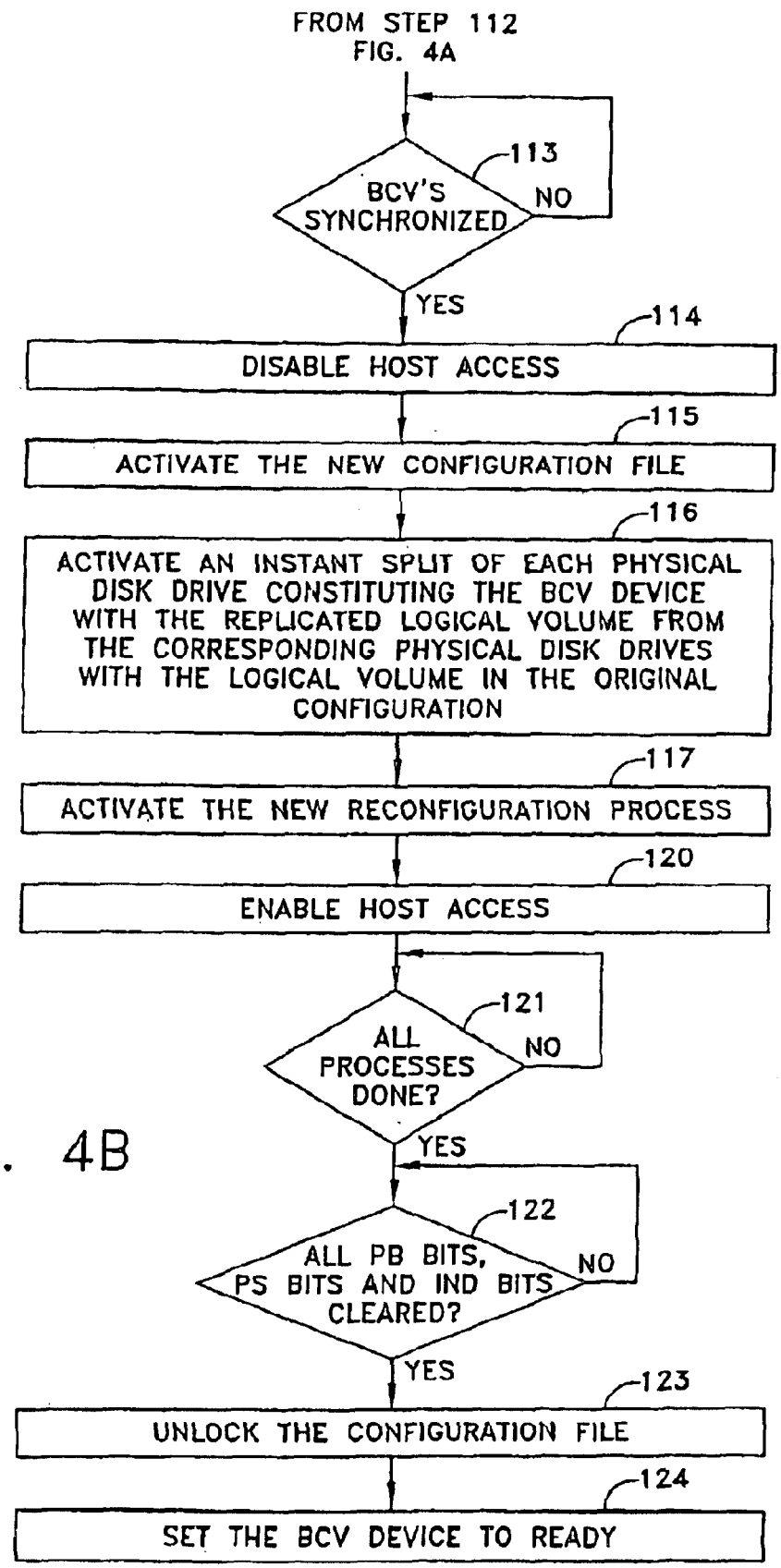

As previously indicated, the reconfiguration process begins when the service processor 40 invokes its RECONF module 50 as shown in FIGS. 4A and 4B. Referring to FIG. 4A, step 101 identifies the new logical cylinder subsets as an example of any arbitrary logical subset that might be selected. In the context of FIGS. 1 and 2, physical disk drives 31, 33 and 35 are physical devices that stored the logical device according to the original configuration. The physical disk drive 37 will store the new logical cylinder subsets, such as subset locations 37A and 37B in FIG. 2.

Step 102 identifies other physical disk drives collectively as a BCV device that will act as a repository for the replicated logical device 43. Step 102 will identify the physical disk drives 46, 47 and 48 in the embodiment of FIG. 2. Each physical disk drive in the BCV device will have a size that matches the requirements for replicating the corresponding logical cylinder subsets on the physical disk drives that store the data in the original configuration.

Step 103 creates a new configuration file that defines the new configuration for the logical device 42 as shown in FIG. 2.

Step 104 initiates the transfer of the data from the physical disk drives 31, 33 and 35 to the physical disk drives 46, 47 and 48 by using the "ESTABLISH" command associated with the BCV devices. The transfer initiated by this step takes some time, so the service processor 40 can perform other operations in parallel with the transfer as shown by steps 105 through 112.

Step 105 blocks any access to each of the BCV devices 46, 47 and 48 from any other source by setting a status flag to a "not ready" state.

Although a specific step is not shown, it will be recognized that data, syntax, sanity and other checks can be made at this point or at any other point during the foregoing process.

Step 106 sets all the pending split (PS) bits for the logical device cylinders in the original configuration. In terms of FIG. 2, this step sets all the PS bits for the physical disk drives 31, 33 and 35. More specifically, step 106 sets the PS bits 91 in all the tracks in the Track ID table 74 in FIG. 3 for the cylinders corresponding to the logical cylinder subsets 31A, 31B, 33A, 33B, 35A and 35B as they contained logical cylinders A through L. This indicates that none of the entries in the Track ID table associated with the original configuration have been transferred to the Track ID tables associated with new configuration.

Step 107 locks the new configuration file in a set of configuration files 108 in FIG. 1 so that no other application can modify that file during the reconfiguration process.

Step 110 initializes a data transfer background session. A data transfer background session in the disclosed embodiment uses elements of an SMMF_FILE session as described in the above-identified Ser. No. 09/342,608. The initialization of sessions is known in the art. As part of this initialization, step 110 selects a column in the PB header 89 to act as the PB bit position for the session. Then step 111 sets all the PB bits in the selected PB bit column for the tracks in the physical disk drives 46 through 48 that receive the replicated logical device. Setting all the PB bits defines the tasks that the data transfer background process must complete to create the new configuration.

Step 112 sets all the IND bits in the cylinder entry Track ID table 85 for each new logical cylinder subset that will store data from the original configuration. Within the configuration shown in FIG. 2, step 112 sets IND bits in the Track ID table 85 for the cylinders in logical cylinder subset 37A that will receive logical device cylinders G and H.

Once these preliminary operations are complete, control transfers to step 113 in FIG. 4B to wait until the BCV device indicates that all its physical disk drives are synchronized. When this occurs, the BCV device mirrors or replicates the data in its original configuration using the correspondence of physical disk drives 31, 33 and 35 to physical disk drives 46, 47 and 48, respectively, except for any data that might be contained in the write pending slots 44.

Until this point any host accesses have been handled by the data storage facility in a normal fashion according to the logical device 41 shown in FIG. 2. When synchronization occurs, step 114 disables host access to the logical device 41. However, the interval during which host access is denied will be very short because the times required to process steps 115, 116 and 117 do not depend upon the times for performing any data transfers between tracks on the different physical disk drives. Consequently, the denial of host access will be in the millisecond time domain. Interruptions to normal host activity in such time domains is generally acceptable in the industry and does not require any interruption of input-output processes.

Step 115 in FIG. 4B activates the new configuration file in the configuration files 108 in FIG. 1. This configuration file specifies or defines the logical device 42 in its new configuration with the four physical disk drives 31, 33, 35 and 37.

Step 116 activates an instant split background process. As described in greater detail later with respect to FIG. 5, this instant split background process allows an immediate disconnection of each of the physical disk drives 46, 47 and 48 from the corresponding physical disk drives 31, 33 and 35 in an orderly fashion. The instant split further signals its completion back to the application immediately, even though no data, including data awaiting destaging in the write pending slots 44, has been transferred.

Figure 6A:
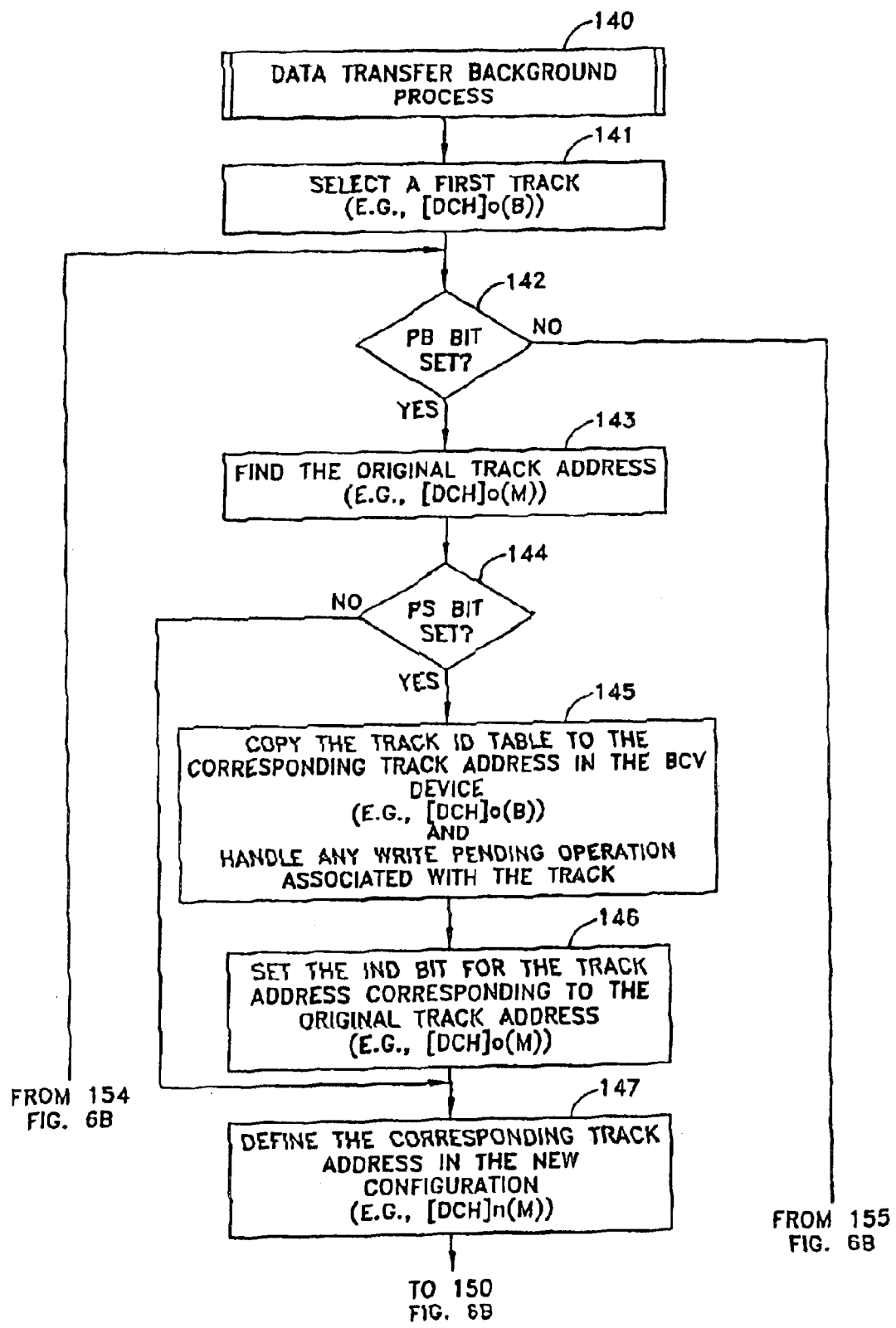
FIGS. 6A and 6B are flow charts of a data transfer background process activated by the process in FIGS. 4A and 4B.
Figure 6B:
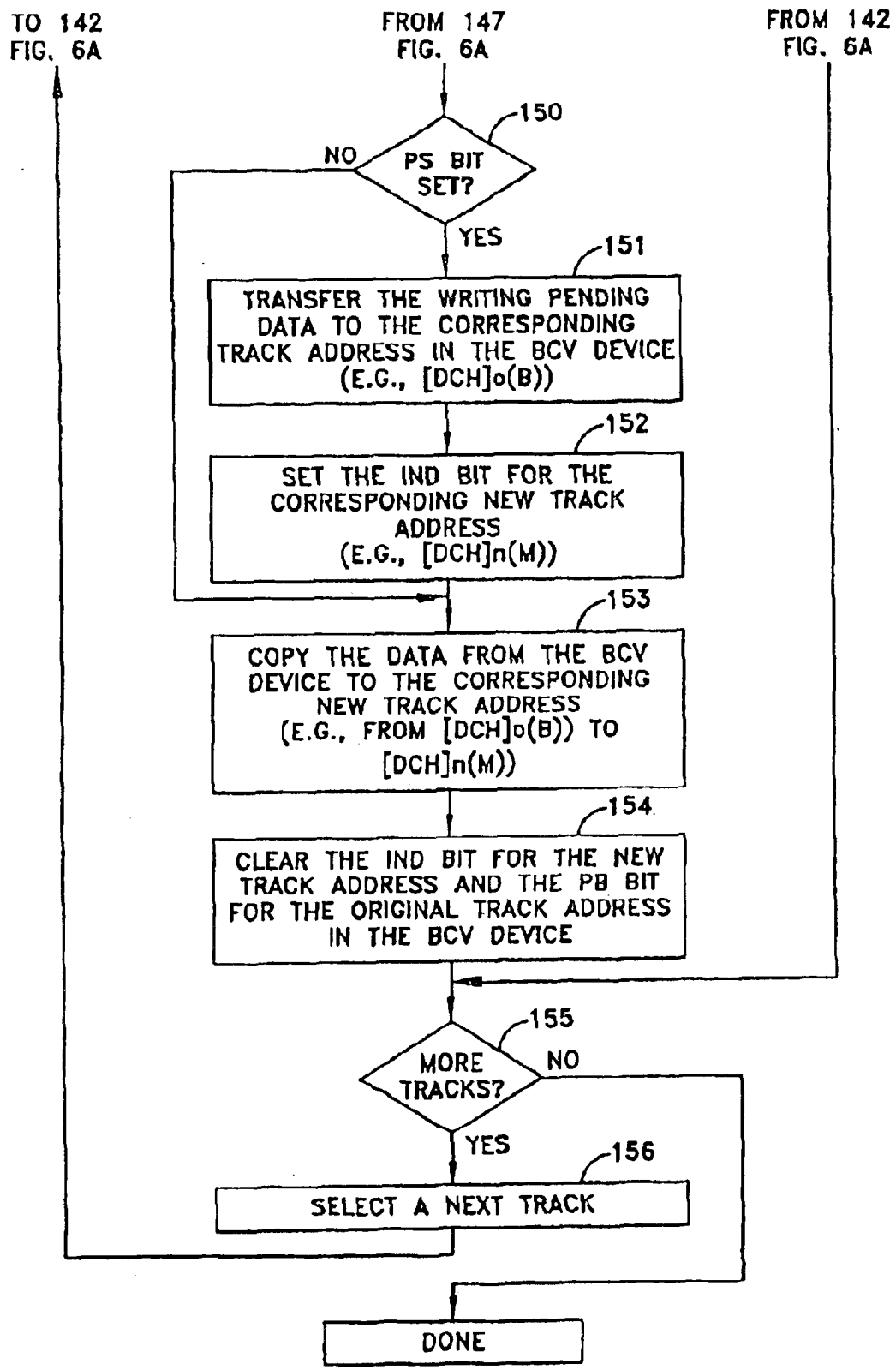
Figure 7:
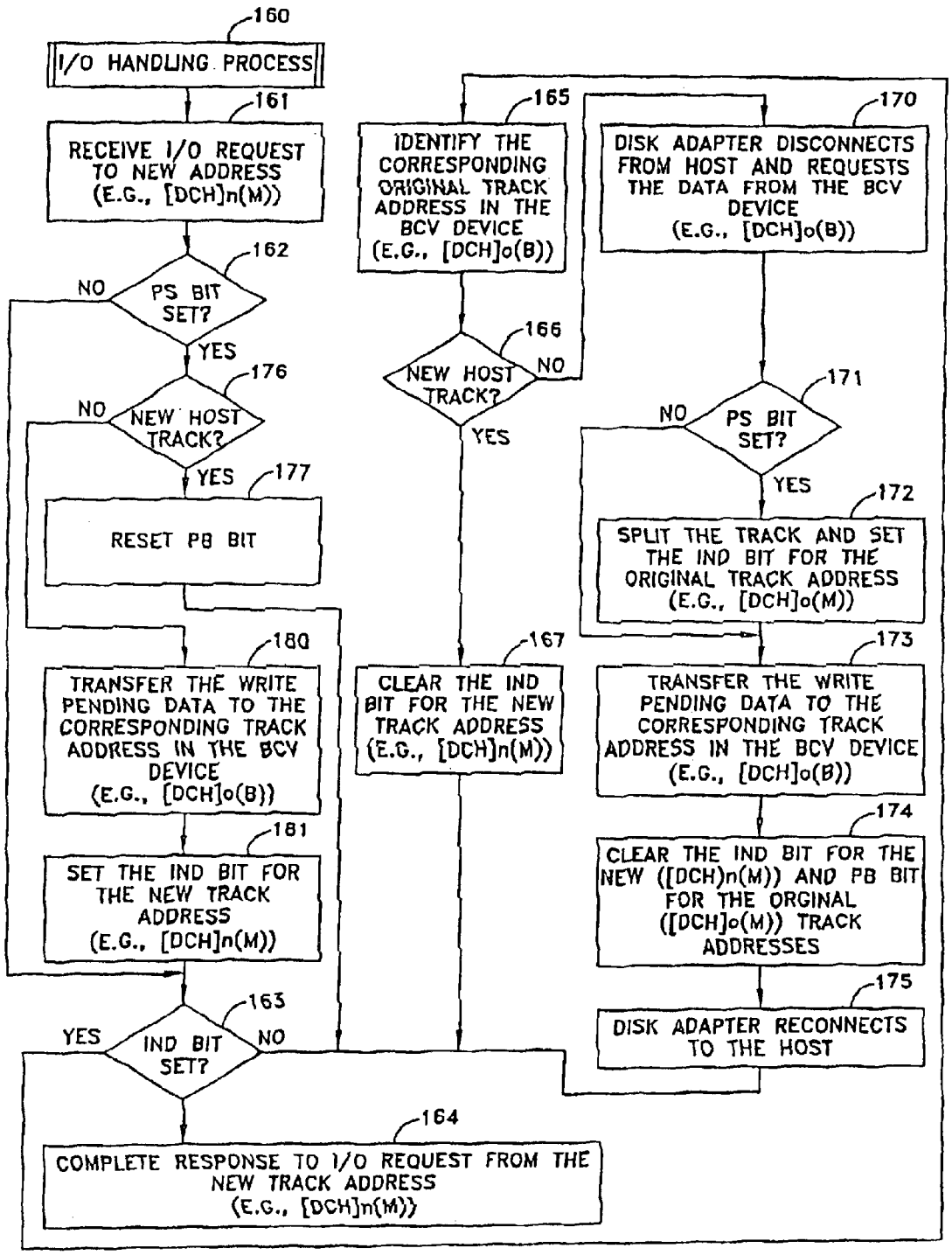
FIG. 7 is a flow chart of an I/O request handling process that responds to requests from a host application during the reconfiguration process of FIGS. 4A and 4B.
Figure 1:
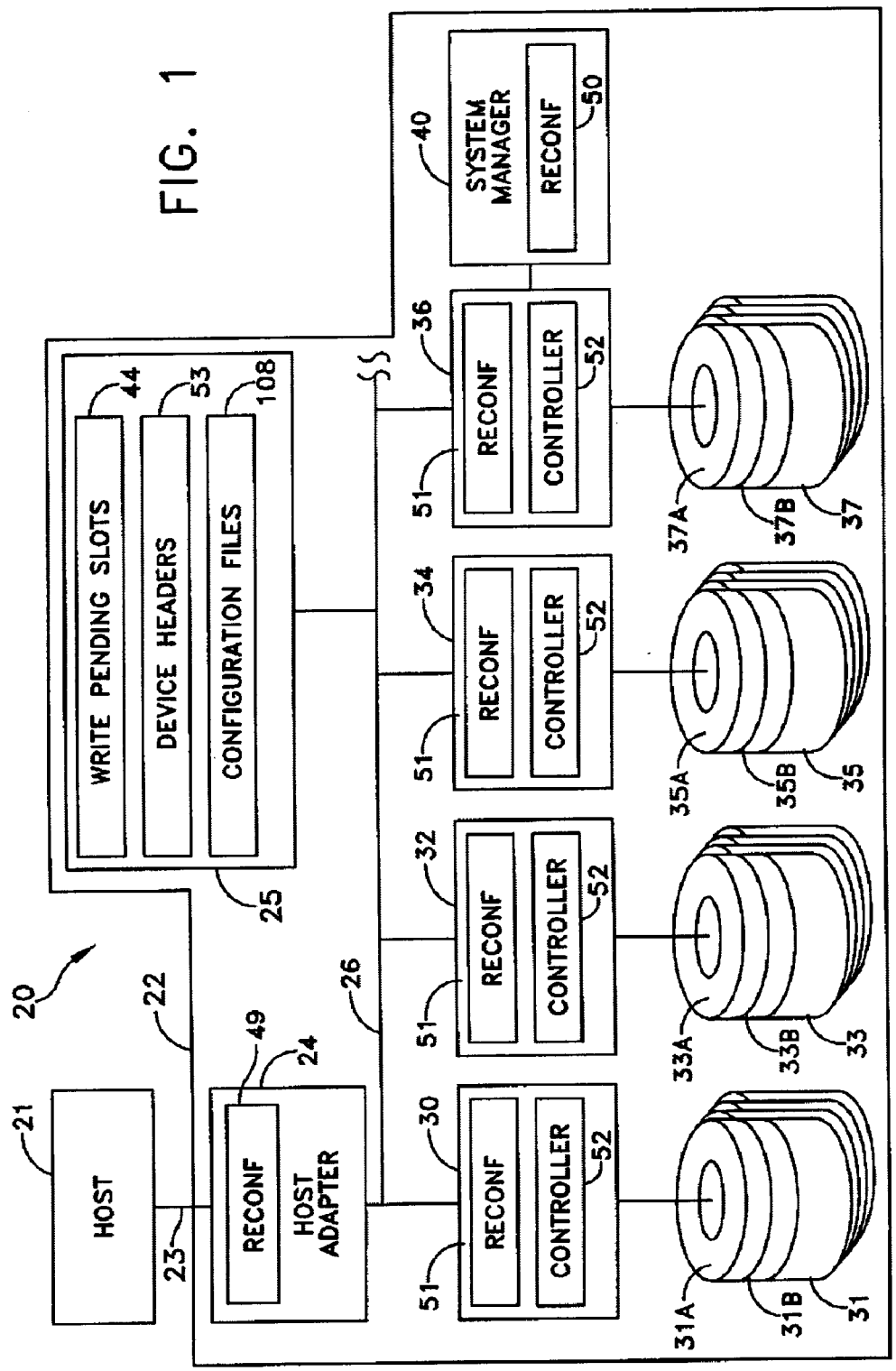
Figure 2:
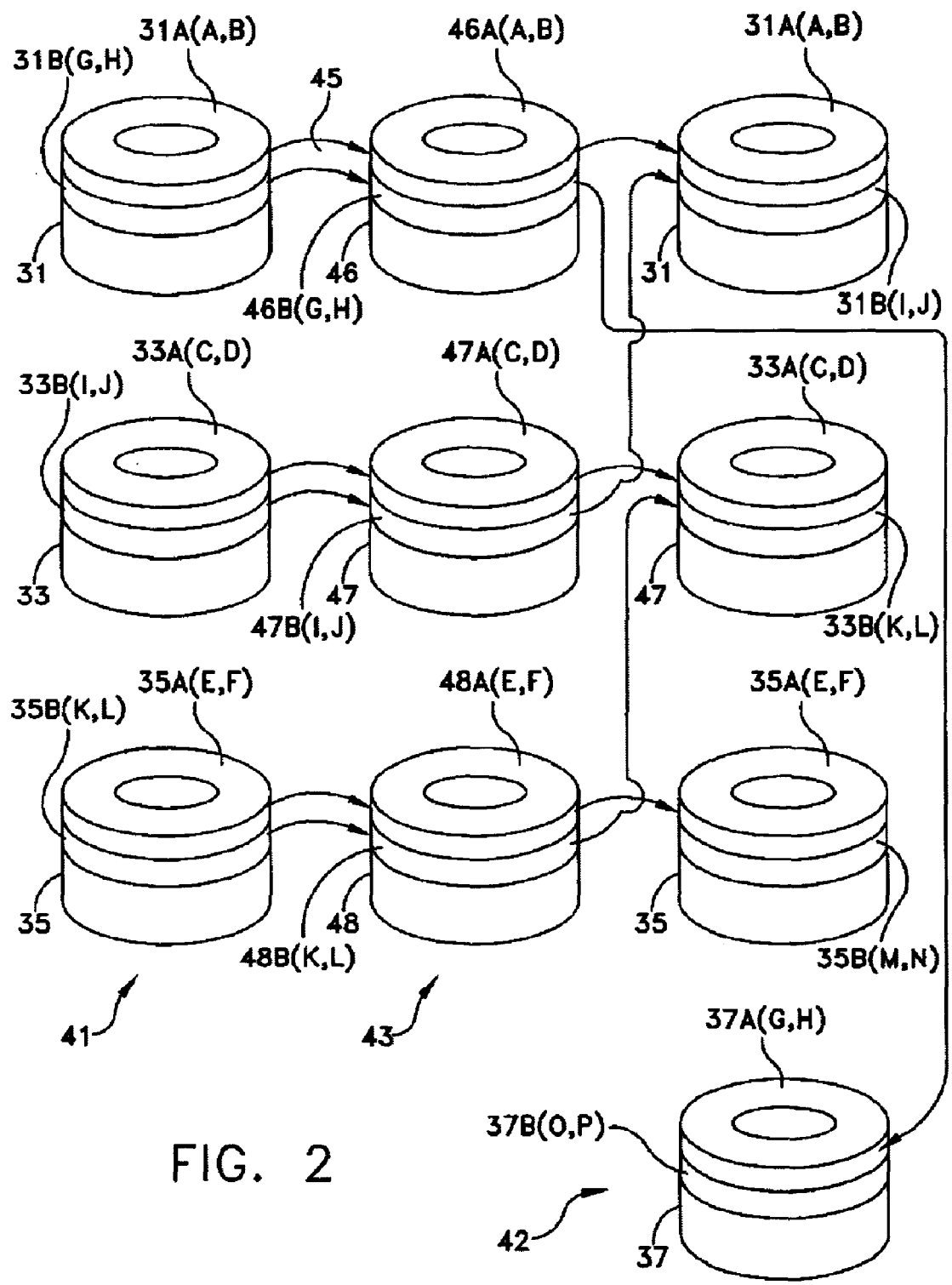
Figure 3:
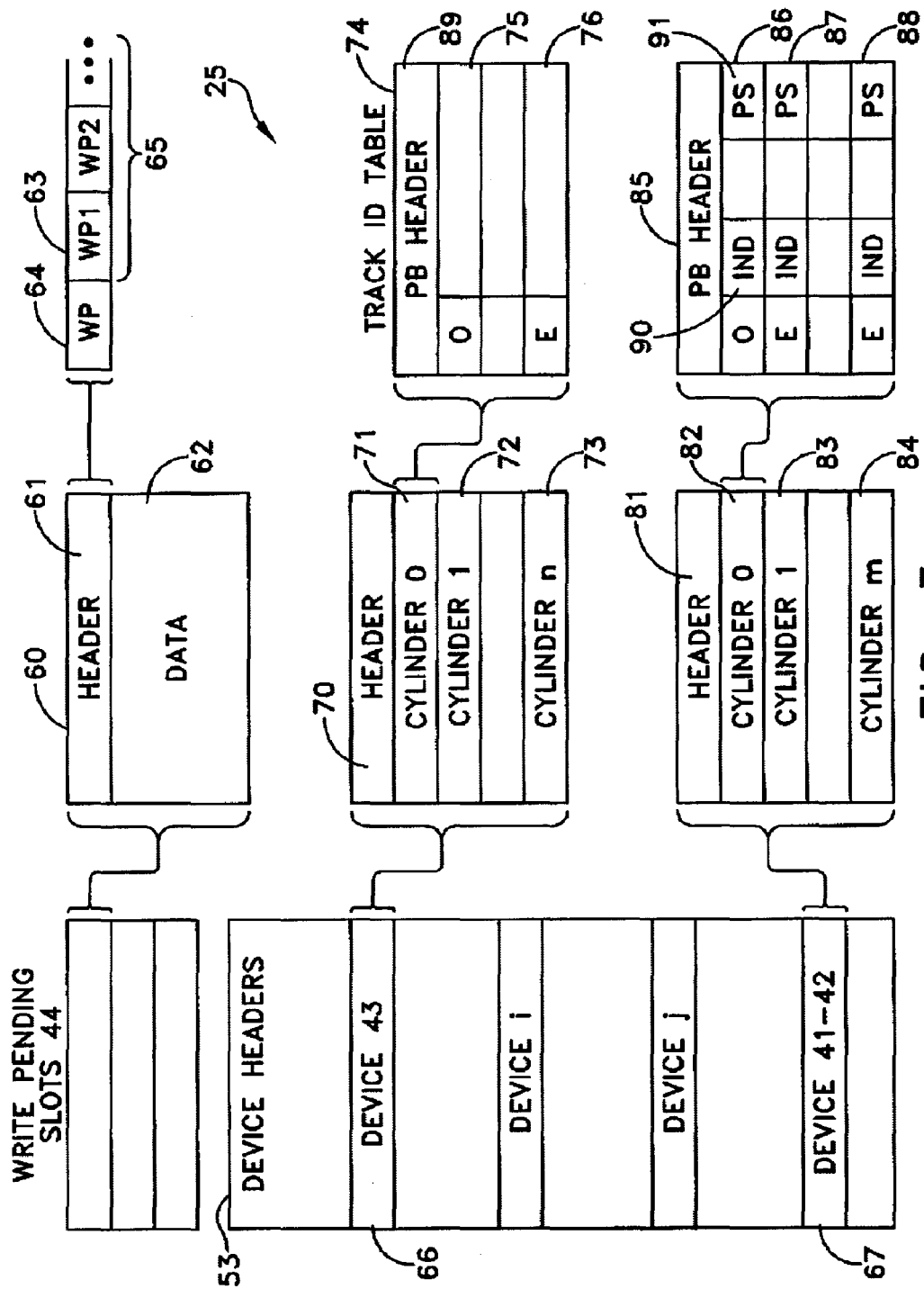
Figure 4A:
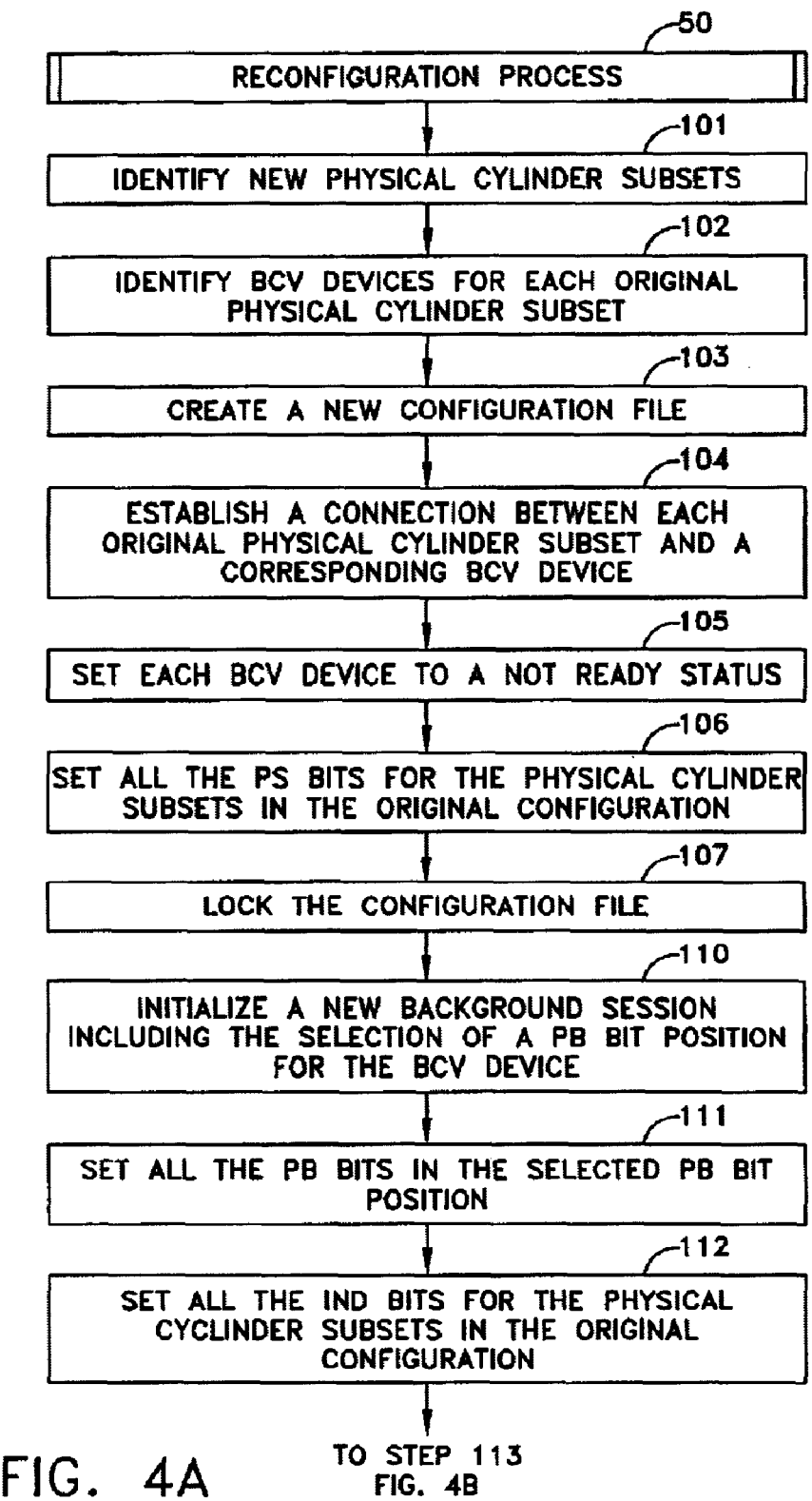
Figure 4B:
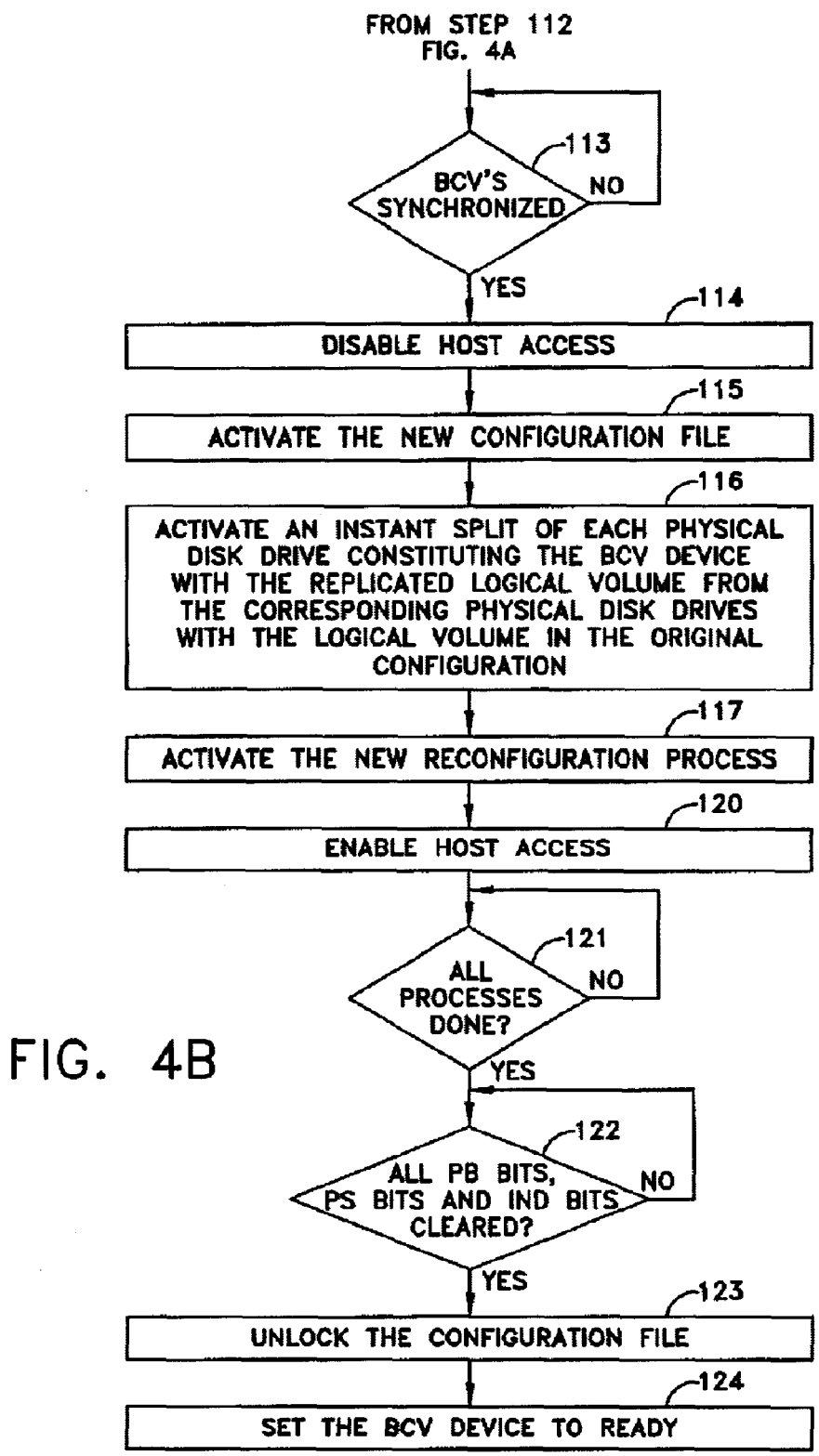
Figure 5:
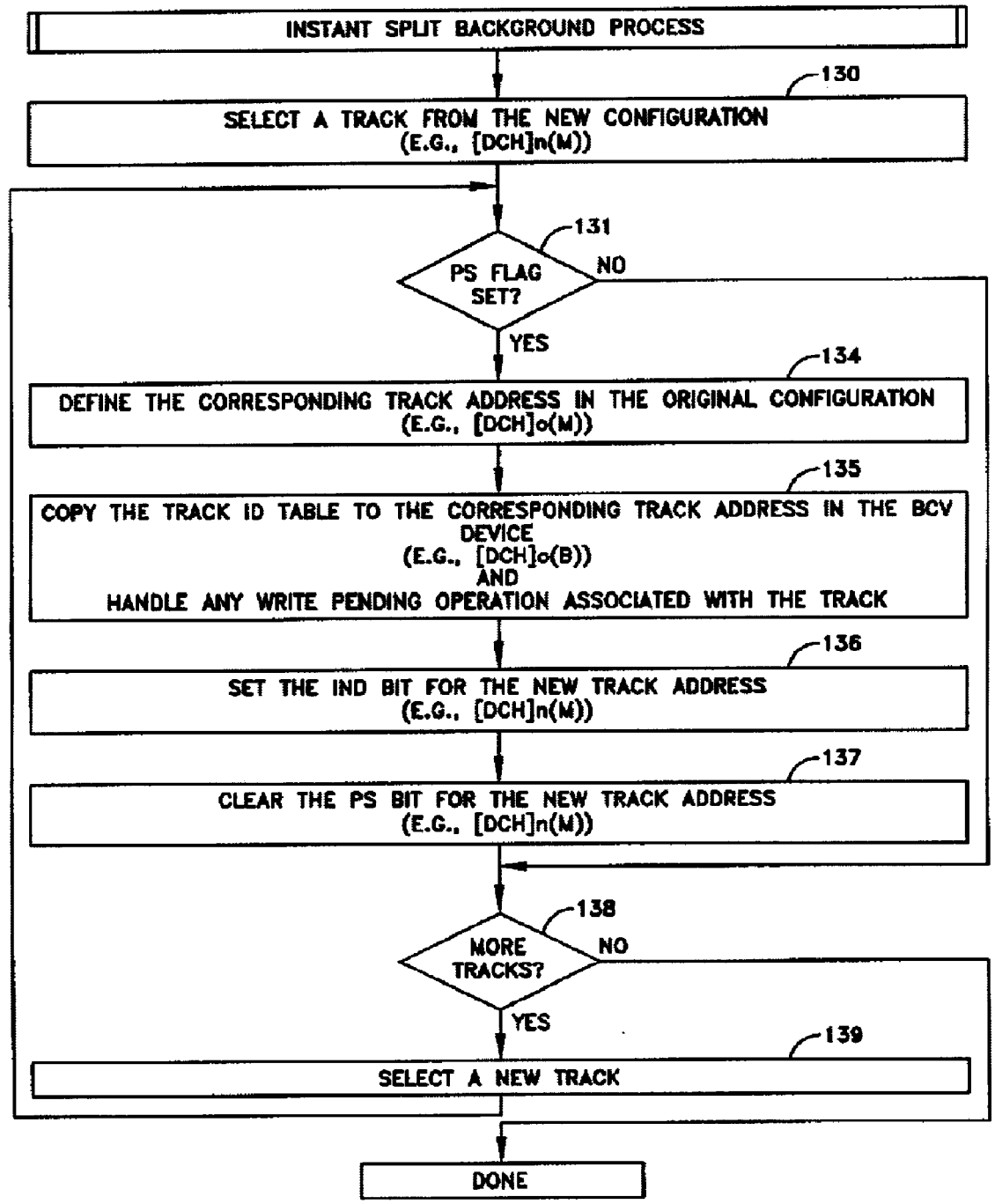
Figure 6A:
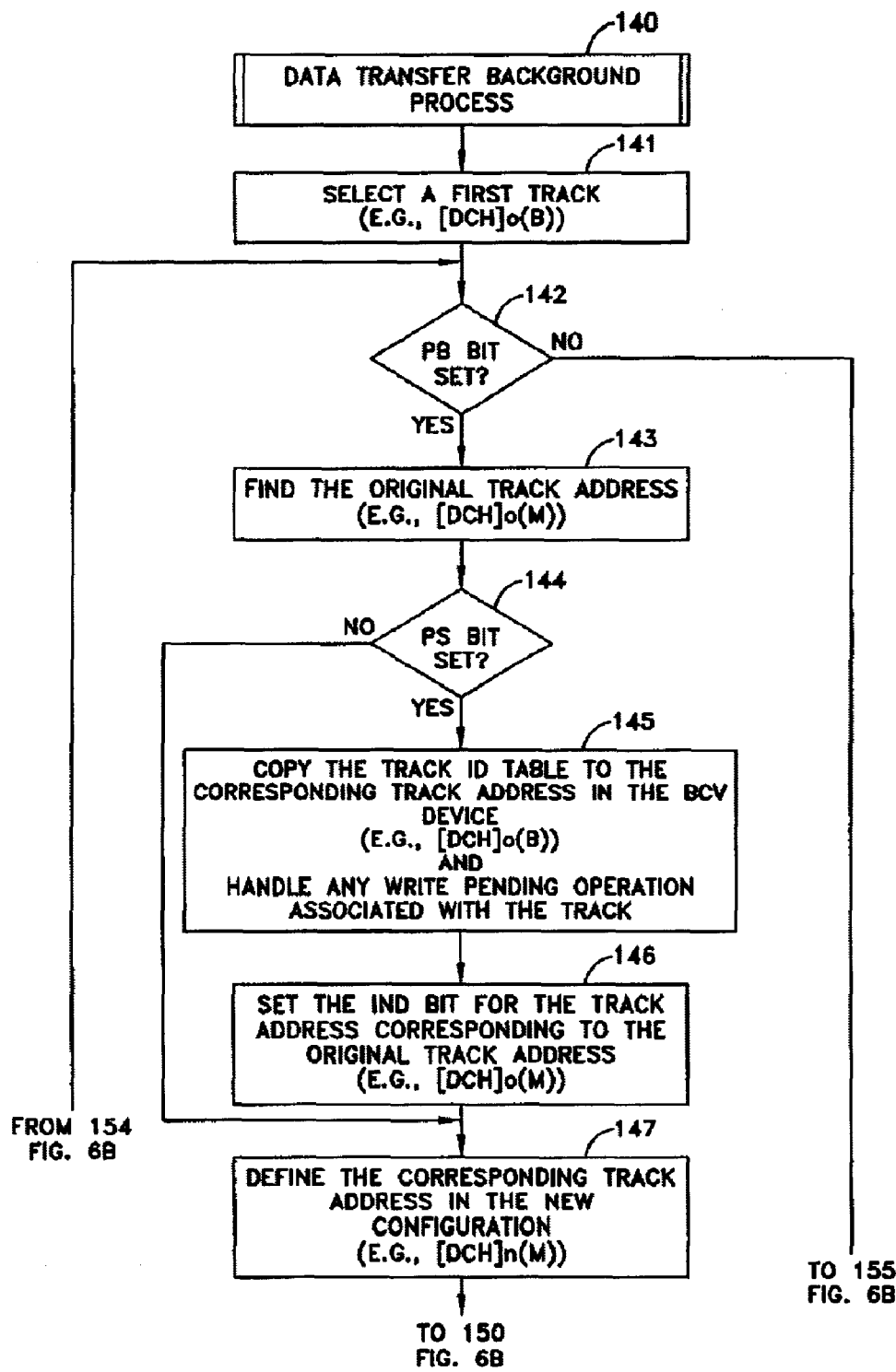
Figure 6B:
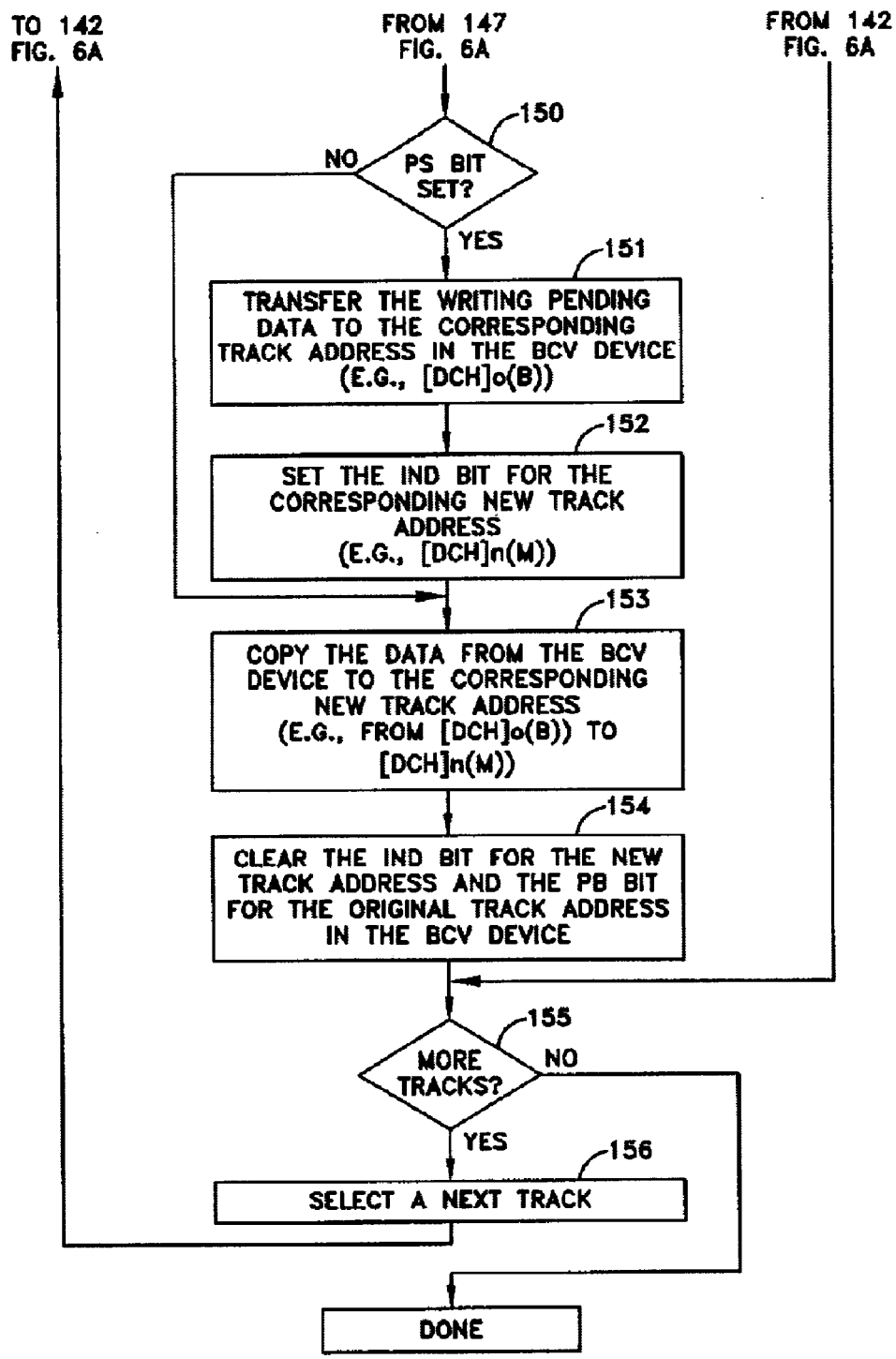
Figure 7:
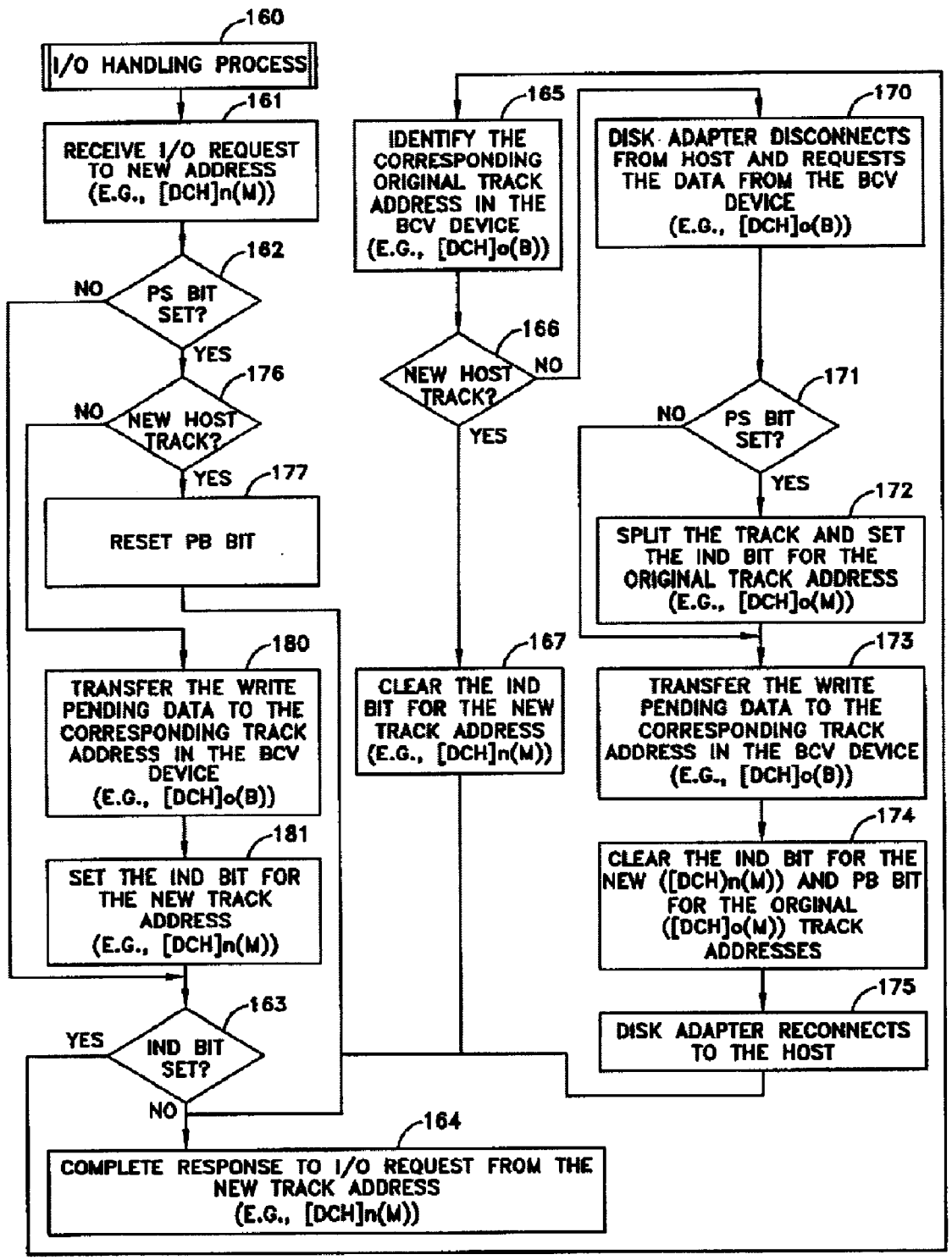

Step 117 activates the reconfiguration process by activating a data transfer background process shown in FIGS. 6A and 6B and enabling an I/O request handler shown in FIG. 7.

After the short interval is takes to process steps 115, 116 and 117, step 120 enables host access to the data, now in its new configuration. The host immediately begins to access any of the locations in the logical device 42 with its new configuration even though no data transfer has occurred and even during reconfiguration transfers. The processes of FIGS. 5, 6A, 6B and 7 coordinate these transfers of data in an orderly fashion.

When the pending split and data transfer background processes are complete in each disk adapter, step 121 transfers control to step 122 that tests all the PB, PS and IND bits. If they are all cleared, all data has been properly transferred, so step 123 unlocks the configuration file and step 124 sets the BCV device to a ready value so that the physical drives 46, 47 and 48 are available for other purposes. This completes the reconfiguration process and all the data is stored according to the configuration 42 in FIG. 2.

Instant Split Background Process

Figure 5:
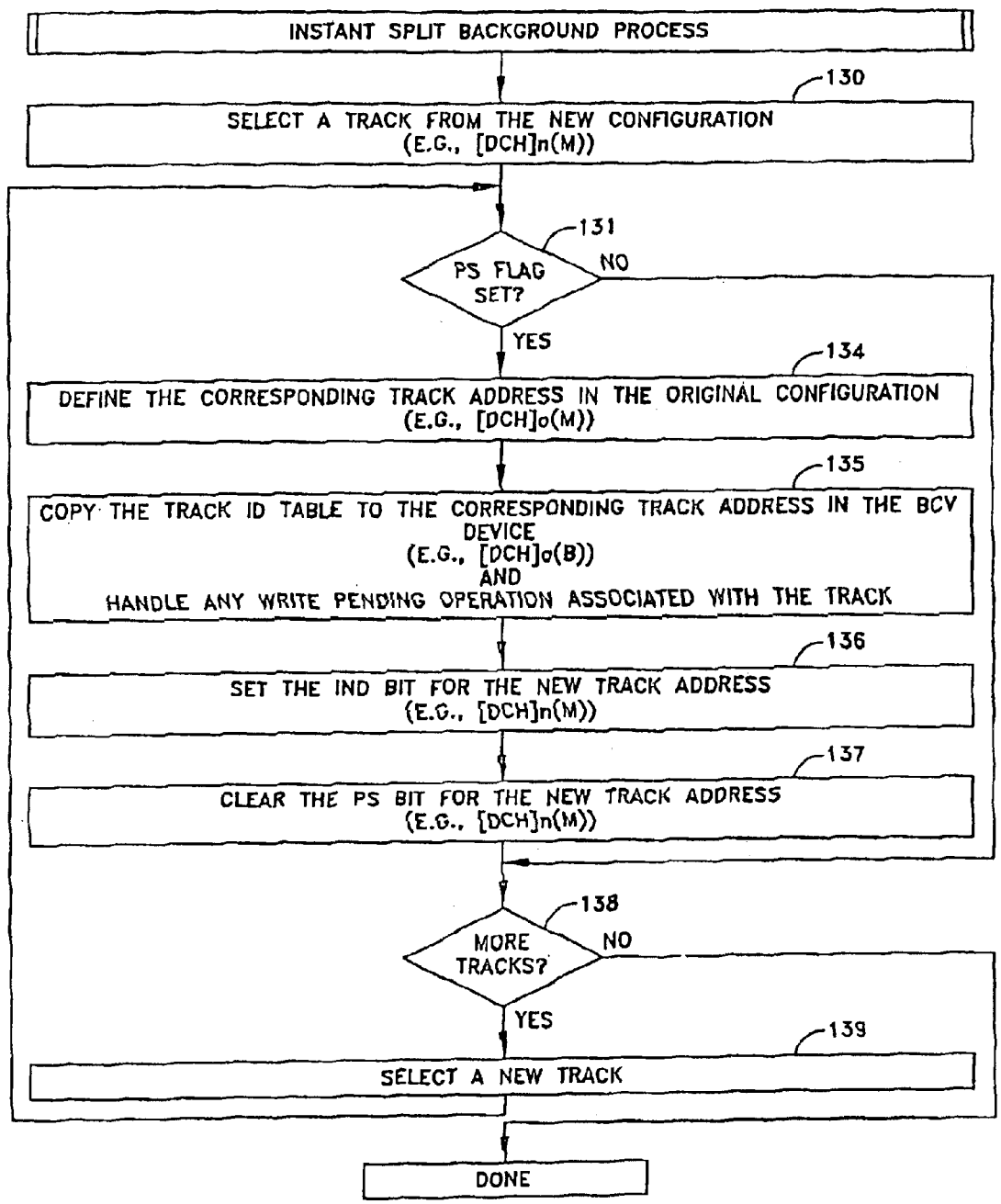
FIG. 5 is a flow chart of an instant split background process activated by the process in FIGS. 4A and 4B.

When step 116 in FIG. 4B activates the instant split operation, it is possible that a number of write pending operations exist. This means that there is data in the cache memory 25 of FIG. 1 that is to be written to the logical device in its original configuration, but has not yet been transferred to a physical disk drive. FIG. 5 depicts the instant split background process that handles such write pending operations.

The process of FIG. 5 begins when step 130 selects a track according to the new configuration. Using a logical device-cylinder-head [DCH] syntax, the logical track addresses for the new and original configurations have the forms [DCH]n(M) and [DCH]o(M), respectively.

Step 131 tests the PS bit for the [DCH]n(M) address. If the PS bit is set, control transfers to step 134 that establishes a correspondence between the [DCH]n(M) and [DCH]o(M) addresses. For example, track I in the original configuration is located in the logical cylinder subset 33B by the [DCH]o(M) address and in the logical cylinder subset 31B by the [DCH]n(M) address. Thus for logical device cylinder "I", the [DCH]n(M) address points to a track in the logical cylinder subset 31B; the [DCH]o(M) address, to a track in the logical cylinder subset 33B.

Step 135 uses a track reassignment process described in the above-identified U.S. patent application Ser. No. 09/303, 242 to test the track in the original configuration to determine if any write pendings need to be handled for this track. First step 137 transfers the Track ID table entry for the track from the original configuration location in the Track ID table 85 to the corresponding location in the Track ID table 74 for the BCV device. Then the process handles any write pending data by updating information in the Track ID table 74 to assure that the data moves from the corresponding write pending slot to the [DCH]o(B)] address in the BCV device. This process will also clear the corresponding one of the WPk bits 65 and, if appropriate, the WP bit 64 shown in FIG. 3.

Step 136 sets an IND bit for the new [DCH]n(M) track address. Again, in this specific example this would set the IND bit for the entry in the Track ID table 85 associated with logical device cylinder I in the logical cylinder subset 31B. Setting an IND bit indicates that the data in the corresponding track associated with the original logical device is no longer relevant and that data therefore must be obtained from the corresponding BCV device. That is, this will indicate that the data in the addressed track in the logical cylinder subset 31B is no longer relevant and must be obtained from the corresponding BCV, namely a track in the logical cylinder subset 47B that carries the original track data for logical cylinder 33B. After this occurs, step 138 clears the PS flag for the track identified by the [DCH]o(M) address.

If step 131 determines that the PS bit is not set or if step 137 clears the PS bit, the processing of the specified track is complete. Control passes to step 138. If more tracks exist, step 138 transfers control to step 139 that selects a next track, typically in sequence, and returns control to step 131.

When all the tracks are tested, the instant split background process terminates. If neither the data transfer background process nor the I/O request handler had acted on any track during the instant split background process, all the data in the BCV device would accurately reflect the data in the original configuration including any write pending data that existed at the time step 116 in FIG. 4B activated the instant split background process.

As will become apparent, either the data transfer background process or I/O handling process might reset the PS bit before the track is selected. If this occurs there is no need to process any such track further. Consequently whenever step 131 determines that the PS bit is not set, control also transfers directly to step 138.

The process of FIG. 5 generally will complete within a matter of a few minutes. If the process in FIG. 5 were to occur without any interaction as set forth in FIGS. 6A, 6B and 7, upon completion of the process, all the IND bits for the tracks located in the logical cylinder subsets 31A, 31B, 33A, 33B, 35A and 35B would be set; the IND flags in the Track ID tables for tracks in the logical cylinder subset 37A would also be set from previous action. All the PS bits associated with the tracks in the cylinder subset 37B would be cleared. As will now also be apparent, the procedure of FIG. 5 does not move any data between the physical disk drives 31, 33, 35 and 37. It will write any data in the write pending slots to appropriate sites in the replicated logical device contained in the physical disk drives 46 through 48, but this data is resident in the cache memory 25, so these writing operations do not require a great time interval.

The Data Transfer Background Process

When step 117 in FIG. 4B activates the reconfiguration process, it activates the data transfer background process of FIGS. 6A and 6B that transfers data stored in the replicated logical device in the BCV device to the physical disk drives 31, 33, 35 and 37 according to the new logical device configuration. As previously stated, this data transfer background process can operate concurrently or in parallel with the instant split background process in FIGS. 4A and 4B and the I/O request handler of FIG. 7.

The data transfer background process 140 as shown in FIG. 6A begins by selecting a first track in step 141 according to the original configuration. In the specific example shown in FIG. 2 an initial [DCH]o(B) address identifies a first track on logical device cylinder A in the logical cylinder subset 46A.

Step 142 determines whether the corresponding PB bit in the PB header, such as the PB header 89 of the track ID table 74, is set. It is set at the beginning of the operation. It would not be set, for example, if the I/O request handler of FIG. 7 had previously processed an I/O request for the corresponding track.

Assuming the PB bit is set, step 143 determines the [DCH]o[M] address for the track in the original configuration. For the first track this could be the location of the first track in the physical disk drive 31 of FIG. 2. Step 144 then determines whether the corresponding PS bit is set. This bit would be set if this process were to select the track before the instant split process of FIG. 5 reset the PS bit.

If the PS bit is set, step 145 performs the same function as step 135 in FIG. 5 to split the track and handle any write pending data so the data in the [DCH]o(B) address of the replicated logical device contains accurate data. Step 146 sets the IND bit for the new track in the new configuration that corresponds to the original track address in the old configuration [DCH]o(M).

Whether or not the PS bit is set, step 147 defines the corresponding track address in the new configuration. In the case of logical cylinder I, the [DCH]o(M) address will be the track address in the logical cylinder subset 31B.

Step 150 in FIG. 6B tests the PS bit for this new track. If the original and new tracks are the same, as they will be for the logical device cylinders A through F in the specific embodiment of FIG. 2, step 145 in FIG. 6A will have cleared the PS bit. If the PS bit is set, steps 151 and 152 perform an analogous function to those of steps 145 and 146 for the track that will receive the data. Once these bits are tested and the appropriate actions are taken, step 153 copies the data from the BCV device to the new track address. Thus in the case of logical cylinder I, step 152 copies the data from the corresponding track of the logical cylinder subset 47B to the corresponding track in of the logical cylinder subset 31B.

Step 154 then clears the track IND bit in the track ID table corresponding to the logical cylinder I in the logical cylinder subset 31B. Step 154 also clears the corresponding PB bit for the original track, that is, the PB bit in the Track ID table 74 for the logical cylinder subset 47B. Thus collectively steps 142 through 154 assure a transfer of data in the original configuration from the replicated file in the BCV device to a new location in the physical disk drives as constituted by the new configuration in which the data remains in the same location in the logical device.

Steps 155 and 156 control subsequent transfers on a track-by-track basis until all the tracks are processed whereupon the operation of this data transfer background process is complete. As will now be apparent, if no I/O request were received during the operation of the module in FIGS. 6A and 6B, all the data from the BCV devices represented by physical disk drives 46, 47 and 48 would transfer to their corresponding locations in the physical disk drives 31, 33, 35 and 37. In the specific example of FIG. 2, the transfers would be as follows:

| LOGICAL CYLINDER SUBSETS/LOGICAL DEVICE CYLINDER | |
| --- | --- |
| FROM REPLICATED LOGICAL DEVICE | TO LOGICAL DEVICE WITH NEW CONFIGURATION |
| 46A/AB | 31A/AB |
| 46B/GH | 31B/IJ |
| 47A/CD | 33A/CD |
| 47B/IJ | 33B/KL |
| 48A/EF | 35A/EF |
| 48B/KL | 35B/MN |
|  | 37A/GH |
|  | 37B/OP |

The process will not effect the tracks in the logical device cylinders M through P in the logical cylinder subsets 35B and 37B. Specifically the Track ID table 74 in the BCV device only records the status of tracks existing in the original configuration.

I/O Handling Process

When step 117 in FIG. 4B activates the reconfiguration process, it also enables an I/o request handler in each disk adapter to respond to any I/O request directed to that specific disk adapter. FIG. 7 depicts an I/O request handler 160 that responds to each I/O request the host generates after the host reconnects in step 120 in FIG. 4B. Step 161 in FIG. 7, performed by the RECONF module 49 with the host adapter 24 in FIG. 1, represents the receipt of that request in the host adapter with a new [DCH]n(M) address to a track in the new configuration of the logical device.

There are four separate scenarios or environments under which step 161 can receive an I/O request during the reconfiguration process. In a first, an I/O request directed to a track is received after the instant split background process of FIG. 5 and the data transfer background process of FIGS. 6A and 6B have acted on the track. In a second scenario, an I/O request directed to a track is received after the instant split background process of FIG. 5 has acted on the track, but before the data transfer process of FIG. 6 has acted on the track. In a third scenario, the I/O request is received after the data transfer background process of FIGS. 6A and 6B has acted on the track, but before the instant split background process of FIG. 5. The fourth scenario occurs when an I/O request directed to a track is received before either of the background processes of FIG. 5 or FIGS. 6A and 6B has acted on that track.

First Scenario

Looking at FIG. 7 and each of the four scenarios in order, under the first scenario an I/O request is received after both the background processes of FIGS. 5 and 6 are complete. Consequently the data at the [DCH]n(M) address is valid. The instant split background process has cleared the PS bit for that track and the data transfer background process has cleared the PB and IND bits for that track. In this scenario, control passes from step 162 through step 163 to step 164 that completes the response to the I/O request from the new track address. Thus, for the first scenario the I/O handling process of FIG. 7 operates essentially as a normal response to a host request with the exception of testing the PS and IND bits and all the processing required by this invention occurs in the host adapter RECONF module 49.

Second Scenario

Under the second scenario, the instant split background process of FIG. 5 has handled the corresponding track, but the data transfer background process of FIGS. 6A and 6B has not acted on the track. Consequently the data in the replicated logical device [DCH]o(B) address has been updated with any pending write operations and the data is valid. In this case steps 136 and 137 have also set IND bit and cleared the PS bit corresponding to the [DCH]n(M) address. The set IND bit indicates that the data in the [DCH]n(M) address is the original data and needs to be updated from the replicated logical device. The PB bit for the corresponding [DCH]o(B) address will remain set because the data transfer background process has not acted on the track.

When step 161 receives a request under this scenario, control transfers from step 162 through step 163 to step 165 and following steps performed by the RECONF module 51 in the corresponding disk adapter because the IND bit is set indicating that the data must be retrieved from the BCV device. Step 165 determines the [DCH]o(B) address of the corresponding data in the replicated logical device in the BCV devices that will act as a source for a data transfer.

Step 166 then determines whether the track in the new configuration is a new host track, that is, a track for any logical cylinders M through P that are stored in the logical cylinder subsets 35B and 37B in FIG. 2. If the track is a new host track, then no additional data handling is required because the data in those tracks will, by definition, be new and because any host application using the logical device will not try to access data in those tracks until after data is written to those tracks. So step 167 clears the IND bit for the new track address and transfers control to step 164 to complete the transfer operation in response to the I/O request.

If, however, the track identified in the I/O host is not a new host track (e.g., a track in the logical device cylinder I), control transfers from step 166 to step 170. At this point the disk adapter performing the I/O handling process, such as the disk adapter 30 connected to the physical disk drive 31, disconnects from the host and requests the data from the [DCH]o(B) address in the BCV device. This request initializes the parameters to effect a data transfer as described with respect to FIGS. 6A and 6B but limited to a transfer from the [DCH]o(B) address to the [DCH]n(M) address. For the logical device cylinder I, the [DCH]o(B) address identifies a track in the logical cylinder subset 47B.

As the instant split background process in FIG. 5 has not been completed for the track in the original configuration, the PS bit for the [DCH]o(M) address may or may not be set. If it is, step 171 will transfer control to step 172 that effectively splits the track in much the same fashion as the process of step 135 in FIG. 5. Specifically, the contents of the track ID table for the original location will be transferred from the Track ID table 85 to the Track ID table 74 in FIG. 3 and any write pending data will be transferred to the BCV device. Then step 172 sets the IND bit for the track address in the original device.

After any action by step 172, step 173 transfers data from the [DCH]o(B) address in the BCV device to corresponding [DCH]n(M) address in the new configuration. Step 174 completes the operation by clearing the corresponding IND and PB bits for the [DCH]n(M) and [DCH]o(B) addresses respectively. Thereafter step 175 reconnects the disk adapter to the host so the operation requested by the I/O request can be completed with respect to the new track address.

Third Scenario

In the third scenario the I/O request is received after the data transfer background process of FIGS. 6A and 6B has acted in a track, but before the instant split background process of FIG. 5. The data transfer background process will have cleared the IND bit and the PS bit to the [DCH]n(M) address and the PB bit for the [DCH]O(B) address in steps 145 and 146. In this scenario, like the first scenario, after step 161 receives an I/O request, control transfers from step 162 through step 163 to step 164 to complete the I/o request.

Fourth Scenario

The fourth scenario assumes that an I/O request is directed to a track before either of the background processes of FIG. 5 or FIGS. 6A and 6B act on that track. During the initialization of the reconfiguration process described in FIGS. 4A and 4B, step 106 set all the PS bits for the tracks in physical disk drives 31, 33 and 35. Step 112 set all the IND bits for the tracks in the logical cylinder subset 37A that receives the logical device cylinders G and H; the IND bits for the tracks in the logical cylinder subset 37B are cleared.

Given these diverse conditions on different logical cylinder subsets, the specific response of the I/O handling process depends on which logical cylinder subset contains the [DCH]n(M) address. The responses to these different environments can be understood by reference to four specific examples of an I/O request involving a track in:

(1) logical cylinder I stored in physical disk drives present in both the original and new configurations,
(2) logical cylinder G stored in physical disk drive 35 in the original configuration and stored on the new physical disk drive 37 in the new configuration,
(3) logical cylinder M that is a new logical device cylinder stored in physical disk drive 35 that was included in the original configuration; and
(4) logical cylinder O that is a new logical device cylinder stored in the new physical disk drive 37.

When the I/O request received in step 161 is to logical device cylinder I prior to any processing of the corresponding track by the background processes, the PS bits for both the [DCH]n(M) and [DCH]o(M) addresses are set. Step 162 transfers control to step 176. The logical device cylinder I is not located in a new host track, so step 176 transfers control to step 180 that splits the track and handles any write pending operation, like the operation at step 135 of FIG. 5. Then step 181 sets the IND bit for the [DCH]n(M) address so that step 163 transfers control to step 165. Step 165 then identifies the corresponding [DCH]o(B) address. As previously stated, track addresses in the logical cylinder I are not addresses for new host tracks, so step 166 transfers control to steps 170 through 175 that then enable step 164 to respond to the I/O request.

If the I/O request identifies a track in the logical device cylinder G, both the PS and IND bits will have been set. Consequently, step 162 passes control to step 176. In the new configuration, the logical cylinder G is stored on the new physical disk drive 37 and the track not a new host track. If it were, step 177 would reset the PB bit for the [DCH]o(B) address. Clearing the PB bit prevents the data transfer background process from subsequently overwriting the track that the [DCH]n(M) defines. However, for the logical cylinder G, steps 180 and 181 split the track corresponding to the [DCH]o(B) address thereby clearing the PS bit and then set the IND bit for the track corresponding to the [DCH]n(M) address. Then step 163 transfers control through steps 165 and 166 to the operations that steps 170 through 175 define.

As previously stated, the first I/O request to a track in either of the logical device cylinders M or O, as new logical cylinders, should be a write operation. In either situation, the PS and IND bits for the [DCH]n(M) addresses will be cleared. Consequently step 162 transfers control through step 163 to step 164 to complete the write operation. Thereafter any subsequent read operation, even during the reconfiguration process, will interact correctly with those tracks.

As will now be apparent, the processes of FIGS. 5, 6A and 6B and the I/O request handler of FIG. 7 operate within the RECONF modules 49 and 51 of FIG. 1 after being initialized from the service processor 40. No host intervention is required by these modules. The host is able to utilize the new configuration of the logical device even though no data has actually been transferred and remains in the original configuration. Collectively the processes of FIGS. 4 through 7 maintain data integrity by replicating the original file onto the BCV device comprising the physical disk drives 46, 47 and 48 of FIG. 2 and thereafter transferring the data on a priority basis in which I/O requests have the highest priority. Consequently the configuration in FIGS. 1 through 3 and the processes and methodology shown in FIGS. 4 through 7 enable a straightforward reconfiguration of a striped file or logical device as a conventional striped file or as a meta file. This reconfiguration occurs transparently to host operations while the data in the logical device remains on line and accessible to a host processor and host applications.

FIGS. 1 through 7 disclose this invention in terms of a specific embodiment for use on a specific disk array storage devices for the purpose of expanding the capacity of the logical device without changing stripe size. However, as will now be apparent, the reconfiguration can also be used to change the stripe size through a change to the configuration file. FIG. 8 depicts the change that occurs if the original configuration in FIG. 2 is merely changed to halve the stripe size so each stripe on each physical disk drive contains one logical cylinder. In this case the twelve logical cylinders will distribute across the three physical disk drives 31, 33 and 37 in four stripes. The instant split and data transfer background processes of FIGS. 5, 6A and 6B operate in the exactly the same way. The I/O request handler of FIG. 7 will also operate in the same way, except that there are no new host tracks in this configuration, so step 162 will always transfer to step 163 and step 166 will always transfer to step 170.

FIG. 9 depicts a new configuration that increases the capacity of the logical device by one-third over the capacity of the original configuration should in FIG. 2 and halves the stripe size. With the new configuration, there are four new cylinders, M through P with new host tracks. All the cylinders are distributed across four physical disk drives, and each physical disk drive has four stripes, rather than two stripes as in the original configuration.

It will also be apparent that the specific procedures merely depict one of many embodiments that can utilize this invention. Different tables and data structures can be substituted for those shown in FIGS. 1 through 3. Alternate sequences or steps might be substituted for the specifically disclosed procedures shown in FIGS. 4 through 7. Many other modifications also can be made to the disclosed apparatus without departing from the invention. Therefore, it is the intent of the appended claims to cover all such variations and modifications as come within the true spirit and scope of this invention.

What is claimed as new and desired to be secured by Letters Patent of the United States is:

1. A method for reconfiguring, from an original configuration to a new configuration, a striped logical device distributed across a plurality of physical disk drives in a disk array storage device and responsive to input-output requests from a host application wherein the disk array storage device includes means for making a copy of the striped logical device in the original configuration concurrently with operations between the host application and the logical device in its original configuration and means for isolating the copy, said method being characterized by including the steps of:

A) converting the logical device to its new configuration whereby the host application thereafter can interact with the logical device in its new configuration, B) transferring data from the isolated copy to corresponding locations according to the new configuration concurrently with operations between the host application and the logical device in its new configuration, and C) responding to an input-output request from the host application for non-transferred data according to the new configuration by transferring data from a corresponding location in the copy to location in the logical device identified by the input-output request.

2. A method as recited in claim 1 wherein the data processing system includes other physical disk drives and wherein said method is further characterized by including, during copying the steps of:

i) generating for the logical device a first list of all data locations on the physical disk drives according to the original configuration, and ii) replicating the data in the logical device onto the other physical disk devices according to the original configuration.

3. A method as recited in claim 2 wherein said step of converting the logical device to its new configuration includes:

i) generating a second list of all data locations on the physical disk drives that are to receive data from the original configuration according to the new configuration, and ii) generating the new configuration whereby host requests are directed to the storage locations as established by the second configuration.

4. A method as recited in claim 3 wherein said transferring step includes iteratively transferring data from the other physical disk drives containing the replicated data to a corresponding physical disk drive location according to the original configuration and information in the first list.

5. A method as recited in claim 4 wherein said response to an input-output request includes transferring the data according to the second configuration and information on the second list.

6. A method as recited in claim 1 wherein the data processing system includes other physical disk drives and wherein the method is further characterized by A) generating, during said data copying, for the logical device a first list of all data locations on the physical disk drives according to the original configuration and replicating the data in the logical device onto the other physical disk devices according to the original configuration; and B) generating, during said conversion, a second list of all data locations on the physical disk drives that are to receive data from the original configuration according to the new configuration and generating the new configuration whereby host requests are directed to the storage locations as established by the second configuration, and C) iteratively transferring data from the other physical disk drives containing the replicated data to a corresponding physical disk drive location according to the original configuration and information in the first list during said data copy, and D) transferring the data according to the second configuration and information on the second list during said response to an input output request.

7. A method as recited in claim 6 wherein the disk array storage device includes a cache memory for storing data from the host application temporarily before transfer to a physical disk drive, said method being further characterized by the steps of:

A) generating a third list of all data in the cache memory to be transferred to the physical disk drives when said conversion occurs, and B) transferring the data from the cache memory to the replicated data according to its first configuration data location and in response to the third list.

8. A method as recited in claim 7 wherein a different process controls each of said transferring steps and said processes operate concurrently.

9. A method as recited in claim 7 wherein a different process controls each of said transferring steps and wherein said processes operate concurrently and independently of the operation of the host application.

10. In a disk array storage device having a striped logical device distributed across a plurality of physical disk drives in an original configuration wherein the disk array storage device includes copying means for making a copy of the striped logical device in the original configuration concurrently with and transparently to the processing of input-output requests from a host application and means for isolating the copy, said disk array storage device being enabled to reconfigure the striped logical device and being characterized by comprising:

A) a converter that converts the logical device to its new configuration whereby the host application thereafter can interact with the logical device in its new configuration, B) a first transfer module that transfers data from the isolated copy to corresponding locations according to the new configuration concurrently with operations between the host application and the logical device in its new configuration, and C) a second transfer module that responds to an input-output request from the host application for non-transferred data according to the new configuration by transferring data from a corresponding location in the copy to location in the logical device identified by the input-output request.

11. A disk array storage device as recited in claim 10 additionally includes other physical disk drives and wherein said disk array storage device is further characterized by said copying means a first list of all data locations on the physical disk drives according to the original configuration in said copying means whereby said copy means is enabled to replicate the data in the logical device onto the other physical disk devices according to the original configuration.

12. A disk array storage device as recited in claim 11 wherein said converter includes a second list of all data locations on the physical disk drives that are to receive data from the original configuration according to the new configuration, said conversion means generating the new configuration whereby host requests are directed to the storage locations as established by the second configuration.

13. A disk array storage device as recited in claim 12 wherein said first transfer means includes means for iteratively transferring data from the other physical disk drives containing the replicated data to a corresponding physical disk drive location according to the original configuration and information in said first list.

14. A disk array storage device as recited in claim 13 wherein said second transfer means includes means responsive to information on said second list.

15. A disk array storage device as recited in claim 10 additionally including other physical disk drives further characterized by comprising:

A) a first list of all data locations on the physical disk drives according to the original configuration in said copying means, B) said converter includes a second list of all data locations on the physical disk drives that are to receive data from the original configuration according to the new configuration, C) said first transfer module includes a module for iteratively transferring data from the other physical disk drives to a corresponding physical disk drive location according to the new configuration in response to information in said first list, and D) said second transfer module includes means responsive to information on said second list.

16. A disk array storage device as recited in claim 15 wherein the disk array storage device includes a cache-memory for storing data from the host application temporarily before transfer to a physical disk drive, and wherein said disk array storage device is further characterized by:
  A) a third list of all data in the cache memory to be transferred to the physical disk drives, and
  B) a third transfer module for transferring the data from the cache memory to the replicated data according to its first configuration data location and information in said third list.

17. A disk array storage device as recited in claim 16 wherein said copying means and said first, second and third transfer modules operate concurrently.

18. A method as recited in claim 16 wherein said copying means and said first, second and third transfer modules operate concurrently with each other and operate concurrently and independently of a host application.

* * * * *

UNITED STATES PATENT AND TRADEMARK OFFICE
CERTIFICATE OF CORRECTION

| | | |
|---|---|---|
| PATENT NO. | : 6,901,480 B2 | |
| APPLICATION NO. | : 10/777891 | |
| DATED | : May 31, 2005 | |
| INVENTOR(S) | : Don et al. | |

It is certified that error appears in the above-identified patent and that said Letters Patent is hereby corrected as shown below:

Delete Drawing Sheets 1-10 and substitute therefore the Drawing Sheets, consisting of FIGS 1-9 as shown on the attached pages.

Signed and Sealed this

Nineteenth Day of September, 2006

JON W. DUDAS
*Director of the United States Patent and Trademark Office*

| STRIPE NUMBER | PHYSICAL DISK DRIVE | | |
| --- | --- | --- | --- |
| | 31 | 33 | 35 |
| 1 | A | B | C |
| 2 | D | E | F |
| 3 | G | H | I |
| 4 | J | K | L |

FIG. 8

| STRIPE NUMBER | PHYSICAL DISK DRIVE | | | |
| --- | --- | --- | --- | --- |
| | 31 | 33 | 35 | 37 |
| 1 | A | B | C | D |
| 2 | E | F | G | H |
| 3 | I | J | K | L |
| 4 | M | N | O | P |

FIG. 9